United States Patent
Dinan

(10) Patent No.: US 11,671,927 B2
(45) Date of Patent: *Jun. 6, 2023

(54) POWER HEADROOM REPORT FOR A WIRELESS DEVICE AND A BASE STATION

(71) Applicant: Comcast Cable Communications, LLC, Philadelphia, PA (US)

(72) Inventor: Esmael Hejazi Dinan, McLean, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/112,349

(22) Filed: Dec. 4, 2020

(65) Prior Publication Data

US 2021/0297958 A1 Sep. 23, 2021

Related U.S. Application Data

(63) Continuation of application No. 16/245,921, filed on Jan. 11, 2019, now Pat. No. 10,893,486, which is a (Continued)

(51) Int. Cl.
*H04W 52/00* (2009.01)
*H04W 52/36* (2009.01)
(Continued)

(52) U.S. Cl.
CPC ......... *H04W 52/365* (2013.01); *H04L 5/0007* (2013.01); *H04W 52/242* (2013.01); *H04W 52/34* (2013.01); *H04W 72/21* (2023.01)

(58) Field of Classification Search
CPC ........... H04W 52/365; H04W 72/0413; H04W 52/242; H04W 52/341; H04L 5/0007
See application file for complete search history.

(56) References Cited

U.S. PATENT DOCUMENTS 9,713,087 B2 7/2017 Asterjadhi et al.
9,736,795 B2 8/2017 Dinan
(Continued)

FOREIGN PATENT DOCUMENTS

KR 20140058599 A 5/2014
WO 2013162247 A1 10/2013
(Continued)

OTHER PUBLICATIONS

3GPP TSG-RAN WG2 #89 (R2-150372—Introduce PUCCH on SCel, Feb. 2015 1).*
(Continued)

*Primary Examiner* — Lakeram Jangbahadur
(74) *Attorney, Agent, or Firm* — Banner & Witcoff, Ltd.

(57) ABSTRACT

A wireless device receives message(s) comprising configuration parameters of a plurality of cells for communication with a base station. The message(s) comprise a first information element (IE) indicating a new extended power headroom report is configured. The first IE is configured as setup when: a secondary cell is configured with a physical uplink control channel (PUCCH) and a second IE indicates that a power headroom report is configured as setup. The wireless device transmits a media-access-control (MAC) packet comprising one or more power headroom reports.

46 Claims, 15 Drawing Sheets

Related U.S. Application Data continuation of application No. 15/059,910, filed on Mar. 3, 2016, now Pat. No. 10,182,406.

(60) Provisional application No. 62/130,554, filed on Mar. 9, 2015.

(51) Int. Cl.
*H04W 52/24* (2009.01)
*H04W 52/34* (2009.01)
*H04W 72/21* (2023.01)
*H04L 5/00* (2006.01)

(56) References Cited

U.S. PATENT DOCUMENTS

| | | |
|---|---|---|
| 9,872,336 B2 | 1/2018 | Dinan |
| 9,894,681 B2 | 2/2018 | Dinan |
| 2009/0257390 A1 | 10/2009 | Ji et al. |
| 2009/0290550 A1 | 11/2009 | Bhattad et al. |
| 2010/0291937 A1 | 11/2010 | Hu et al. |
| 2010/0303035 A1 | 12/2010 | Gao et al. |
| 2010/0309876 A1 | 12/2010 | Khandekar et al. |
| 2011/0081932 A1 | 4/2011 | Astely et al. |
| 2011/0134774 A1 | 6/2011 | Pelletier et al. |
| 2011/0228731 A1 | 9/2011 | Luo et al. |
| 2011/0243016 A1 | 10/2011 | Zhang et al. |
| 2011/0249634 A1 | 10/2011 | Lee et al. |
| 2011/0305179 A1 | 12/2011 | Wang et al. |
| 2012/0039275 A1 | 2/2012 | Chen et al. |
| 2012/0039279 A1 | 2/2012 | Chen et al. |
| 2012/0069802 A1 | 3/2012 | Chen et al. |
| 2012/0082088 A1 | 4/2012 | Dalsgaard et al. |
| 2012/0083284 A1 | 4/2012 | Harrison et al. |
| 2012/0113913 A1 | 5/2012 | Tiirola et al. |
| 2012/0182879 A1 | 7/2012 | Tamura et al. |
| 2012/0213163 A1 | 8/2012 | Lee et al. |
| 2012/0257570 A1 | 10/2012 | Jang et al. |
| 2012/0329461 A1 | 12/2012 | Teyeb et al. |
| 2013/0010619 A1 | 1/2013 | Fong et al. |
| 2013/0028198 A1 | 1/2013 | Yamada |
| 2013/0094392 A1 | 4/2013 | Kim et al. |
| 2013/0114472 A1 | 5/2013 | Tamaki et al. |
| 2013/0155914 A1 | 6/2013 | Wang et al. |
| 2013/0188570 A1 | 7/2013 | Zhao et al. |
| 2013/0188612 A1 | 7/2013 | Dinan |
| 2013/0215848 A1 | 8/2013 | Kato et al. |
| 2013/0223301 A1 | 8/2013 | Lee et al. |
| 2013/0235768 A1 | 9/2013 | Earnshaw et al. |
| 2013/0250893 A1 | 9/2013 | Li et al. |
| 2013/0250901 A1 | 9/2013 | Dizumi et al. |
| 2013/0272232 A1 | 10/2013 | Dinan |
| 2013/0272233 A1 | 10/2013 | Dinan |
| 2013/0272241 A1 | 10/2013 | Ohta et al. |
| 2013/0279433 A1 | 10/2013 | Dinan |
| 2013/0301446 A1 | 11/2013 | Chen et al. |
| 2014/0016593 A1 | 1/2014 | Park et al. |
| 2014/0023010 A1* | 1/2014 | Loehr ................ H04W 52/365 |
| | | 370/329 |
| 2014/0036659 A1 | 2/2014 | Gao |
| 2014/0036664 A1 | 2/2014 | Han et al. |
| 2014/0050113 A1 | 2/2014 | Rosa et al. |
| 2014/0056220 A1 | 2/2014 | Poitau et al. |
| 2014/0092865 A1 | 4/2014 | Heo et al. |
| 2014/0133373 A1 | 5/2014 | Han et al. |
| 2014/0161060 A1 | 6/2014 | Nam et al. |
| 2014/0161117 A1 | 6/2014 | Sebire et al. |
| 2014/0269595 A1 | 9/2014 | Lee et al. |
| 2014/0348078 A1 | 11/2014 | Kim et al. |
| 2014/0349713 A1 | 11/2014 | Kamada |
| 2015/0003418 A1 | 1/2015 | Rosa et al. |
| 2015/0016350 A1 | 1/2015 | Moulsley et al. |
| 2015/0078286 A1 | 3/2015 | Kim et al. |
| 2015/0098340 A1 | 4/2015 | Oizumi |
| 2015/0098400 A1 | 4/2015 | Lee et al. |
| 2015/0110029 A1 | 4/2015 | Hwang et al. |
| 2015/0117342 A1 | 4/2015 | Loehr et al. |
| 2015/0124670 A1 | 5/2015 | Park |
| 2015/0146588 A1 | 5/2015 | Park |
| 2015/0163791 A1* | 6/2015 | Chen ................ H04L 5/0053 |
| | | 455/552.1 |
| 2015/0181539 A1* | 6/2015 | Aiba ................ H04W 52/365 |
| | | 370/329 |
| 2015/0181590 A1 | 6/2015 | Park |
| 2015/0215079 A1 | 7/2015 | Park |
| 2015/0215977 A1 | 7/2015 | Yamazaki |
| 2015/0223178 A1* | 8/2015 | Pietraski ............ H04W 52/146 |
| | | 370/252 |
| 2015/0223213 A1 | 8/2015 | Moon et al. |
| 2015/0245307 A1 | 8/2015 | Chen et al. |
| 2015/0245347 A1 | 8/2015 | Yi et al. |
| 2015/0271811 A1 | 9/2015 | Kim et al. |
| 2015/0282020 A1 | 10/2015 | Pajukoski et al. |
| 2015/0289179 A1 | 10/2015 | Liu et al. |
| 2015/0312930 A1 | 10/2015 | Han et al. |
| 2015/0319754 A1 | 11/2015 | Ishida et al. |
| 2015/0327230 A1 | 11/2015 | Takeda et al. |
| 2016/0014753 A1 | 1/2016 | Wu et al. |
| 2016/0021646 A1 | 1/2016 | Hu et al. |
| 2016/0044617 A1 | 2/2016 | Vajapeyam et al. |
| 2016/0044655 A1 | 2/2016 | Park et al. |
| 2016/0044737 A1 | 2/2016 | Kwon |
| 2016/0066284 A1 | 3/2016 | Kwon et al. |
| 2016/0100397 A1 | 4/2016 | Wen et al. |
| 2016/0150485 A1 | 5/2016 | Yi et al. |
| 2016/0157191 A1 | 6/2016 | Yokomakura et al. |
| 2016/0192388 A1 | 6/2016 | Ekpenyong et al. |
| 2016/0205681 A1 | 7/2016 | Kim et al. |
| 2016/0227541 A1 | 8/2016 | Damnjanovic et al. |
| 2016/0241377 A1 | 8/2016 | Takeda et al. |
| 2016/0242153 A1 | 8/2016 | Chen et al. |
| 2016/0262118 A1 | 9/2016 | Kim et al. |
| 2016/0277987 A1 | 9/2016 | Chen et al. |
| 2016/0285716 A1 | 9/2016 | Pelletier et al. |
| 2016/0286555 A1 | 9/2016 | Papasakellariou |
| 2016/0302177 A1 | 10/2016 | Kwon et al. |
| 2016/0309425 A1* | 10/2016 | Yi ................ H04W 52/34 |
| 2016/0329993 A1 | 11/2016 | Kim et al. |
| 2016/0330698 A1* | 11/2016 | Loehr ................ H04W 52/241 |
| 2016/0365959 A1 | 12/2016 | Dinan |
| 2016/0366675 A1 | 12/2016 | Dinan |
| 2016/0366681 A1 | 12/2016 | Dinan |
| 2016/0381681 A1 | 12/2016 | Nogami et al. |
| 2017/0006559 A1 | 1/2017 | Kim et al. |
| 2017/0064541 A1 | 3/2017 | Uchino et al. |
| 2017/0111159 A1 | 4/2017 | Lee et al. |
| 2017/0118658 A1 | 4/2017 | Hwang et al. |
| 2017/0141901 A1 | 5/2017 | Rico Alvarino et al. |
| 2017/0251454 A1 | 8/2017 | Yang et al. |
| 2017/0353965 A1 | 12/2017 | Zhang |
| 2017/0367103 A1 | 12/2017 | Suzuki et al. |
| 2017/0367115 A1 | 12/2017 | Sebire |
| 2018/0014285 A1 | 1/2018 | Nishio et al. |
| 2018/0014291 A1 | 1/2018 | Takeda et al. |
| 2018/0020473 A1 | 1/2018 | Suzuki et al. |
| 2018/0027548 A1 | 1/2018 | Suzuki et al. |
| 2018/0063832 A1 | 3/2018 | Kamada et al. |
| 2018/0131494 A1 | 5/2018 | Li et al. |

FOREIGN PATENT DOCUMENTS

| | | |
|---|---|---|
| WO | 2013/179590 A1 | 12/2013 |
| WO | 2014/163320 A1 | 10/2014 |
| WO | 2016157797 A1 | 10/2016 |

OTHER PUBLICATIONS

3GPP TSG RAN WG2 Meeting #89bis R2-151342, Bratislava, Slovakia, Apr. 20-24, 2015, Source: CATT, Title: D-SR on PUCCH SCell.

3GPP TSG RAN WG2 Meeting #90 R2-152277, Fukuoka, Japan, May 25-29, 2015, Source: CATT, Title: D-SR an PUCCH SCell.

(56) References Cited

OTHER PUBLICATIONS

3GPP TSG RAN WG2 Meeting #90 R2-152512, Fukuoka, Japan, May 25-29, 2015, Source: NEC, Title: Potential Issues of SR on PUCCH SCell.
3GPP TSG RAN2 Meeting #90 R2-152524, Fukuoka, Japan, May 25-29, 2015, Source: NEC, Title: Overlapping of D-SR resources.
3GPP TSG-RAN WG2 #89bis R2-151495, Bratislava, Slovakia, Apr. 20-24, 2015, Source: HTC, Title: PUCCH SCell management.
3GPP TSG-RAN WG2 #89bis Tdoc R2-151488, Bratislava, Slovakia, Apr. 20-24, 2015, Source: Ericsson, Title: SR on PUCCH SCell.
3GPP TSG-RAN WG2 #90 R2- 152418, Fukouka, Japan, May 25-29, 2015, Source: HTC, Title: Managing PUCCH Yesources on a deactivated PUCCH SCell.
3GPP TSG-RAN WG2 #90 Tdoc R2-152530, Fukuoka, Japan, May 25-29, 2015, Source: Ericsson, Title: SR on PUCCH SCell.
3GPP TSG-RAN WG2 Meeting #89bis R2-151211, Bratislava, Slovakia, Apr. 20-24, 2015, Source: Nokia Networks, Title: SR on Scell.
3GPP TSG-RAN WG2 Meeting #89bis R2-151324, Bratislava, Slovakia, Apr. 20-24, 2015, Source: Huawei, HiSilicon, Title: Leftover issues for PUCCH on SCell.
3GPP TSG-RAN WG2 Meeting #89bis R2-151469, Bratislava, Slovakia, Apr. 20-24, 2015, Source: Alcatel-Lucent Shanghai Bell, Alcatel-Lucent, Title: SR transmissions on SCell PUCCH.
3GPP TSG-RAN WG2 Meeting #90 R2-152273, Fukuoka, Japan, May 25-29, 2015, Source: Huawei, HiSilicon, Title: Issues for SR on PUCCH SCell.
3GPP TSG-RAN WG2 Meeting #90 R2-152302, Fukuoka, Japan, May 25-29, 2015, Source: Nokia Networks, Title SR on PUCCH SCell.
3GPP TSG-RAN WG2 Meeting #90 R2-152310, Fukuoka, Japan, May 25-29, 2015, Source: Nokia Networks, Title PUCCH SCell pre-activation.
3GPP TSG-RAN WG2 Meeting #90 R2-152366, Fukuoka, Japan, May 25-May 29, 2015, Source: LG Electronics Inc., Title: SR for CA enhancement.
3GPP TSG-RAN WG2 Meeting #90 R2-152742, Fukuoka, Japan, May 25-29, 2015, Source: Qualcomm Incorporated, Title: Dual SR Procedures.
3GPP TSG-RAN2 #89bis Meeting R2-151252, Bratislava, Slovakia, Apr. 20-24, 2015, Source: MediaTek Inc., Title: Remaining issues for PUCCH on SCell.
3GPP TSG-RAN2 #90 Meeting R2-152138, Fukuoka, Japan, May 25-29, 2015, Source: MediaTek Inc., Title Remaining UP issues for PUCCH on SCell.
3GPP TSG RAN WG1 Meeting #80 R1-150067, Athens, Greece, Feb. 9-13, 2015, Source: Huawei, HiSilicon, Title: Support of PUCCH on SCell based on dual connectivity mechanism.
3GPP TSG RAN WG1 Meeting #80 R1-150135, Athens, Greece, Feb. 9-13, 2015, Source: ZTE, Title: Further CA enhancement to support PUCCH on SCell.
3GPP TS 36.211 V13.3.0 (Sep. 2016), Technical Specification 3rd Generation Partnership Project; Technical Specification Group Radio Access Network; Evolved Universal Terrestrial Radio Access (E-UTRA); Physical channels and modulation (Release 13).
3GPP TS 36.212 V13.3.0 (Sep. 2016), Technical Specification, 3rd Generation Partnership Project; Technical Specification Group Radio Access Network; Evolved Universal Terrestrial Radio Access (E-UTRA); Multiplexing and channel coding (Release 13).
3GPP TS 36.213 V13.3.0 (Sep. 2016), Technical Specification, 3rd Generation Partnership Project; Technical Specification Group Radio Access Network; Evolved Universal Terrestrial Radio Access (E-UTRA); Physical layer procedures (Release 13).
3GPP TS 36.300 V13.5.0 (Sep. 2016), Technical Specification, 3rd Generation Partnership Project; Technical Specification Group Radio Access Network; Evolved Universal Terrestrial Radio Access (E-UTRA), and Evolved Universal Terrestrial Radio Access Network (E-UTRAN); Overall description; Stage 2 (Release 13).
3GPP TS 36.321 V13.2.0 (Jun. 2016), Technical Specification, 3rd Generation Partnership Project; Technical Specification Group Radio Access Network; Evolved Universal Terrestrial Radio Access (E-UTRA); Medium Access Control (MAC) protocol specification (Release 13).
3GPP TS 36.331 V13.2.0 (Jun. 2016), Technical Specification, 3rd Generation Partnership Project; Technical Specification Group Radio Access Network; Evolved Universal Terrestrial Radio Access (E-UTRA); Radio Resource Control (RRC); Protocol specification (Release 13).
R1-160561, GPP TSG RAN WG1 Meeting #84, St Julian's, Malta, Feb. 15-19, 2016, Agenda item: 7.3.1.1, Source: Samsung, Title: Discussion on UL power control for UL LAA.
IEEE 802 Interim Session, Atlanta, USA, Jan. 11-16, 2015, Title: 3GPP & unlicensed spectrum.
R1-152739, 3GPP TSG RAN WG1 meeting #81, Fukuoka, Japan, May 25-29, 2015, Agenda Item: 6.2.4.3, Source: LG Electronics, Title: UL power control in LAA.
R1-155472, 3GPP TSG RAN WG1 #82bis, Malmo, Sweden, Oct. 5-9, 2015, Agenda item: 7.2.3.3, Source: Samsung, Title: Impact of LAA dynamic power control.
R1-160886, 3GPP TSG RAN WG1 #84, Feb. 15-19, 2016, St. Julian's, Malta, Agenda item: 7.3.1.1, Source Qualcomm Incorporated, Title: PUSCH power control.
R1-162476, 3GPP TSG RAN WG1 meeting #84bis, Busan, Korea, Apr. 11-15, 2016, Agenda Item: 7.3.1.6, Source: LG Electronics, Title: Power control in LAA uplink.
R1-162662, 3GPP TSG RAN WG1 Meeting #84bis, Busan, Korea Apr. 11-15, 2016, Agenda Item: 7.3.1.1 Source Samsung, Title: Discussion on UL power control for UL LAA.
R1-163023, 3GPP TSG RAN WG1 #84bis, Apr. 11-15, 2016, Busan, Korea, Agenda item: 7.3.1.1, Source Qualcomm Incorporated, Title: PUSCH power control.
R1-163762, 3GPP TSG RAN WG1 #84bis, Busan, Korea, Apr. 11-15, 2016, Agenda item: 7.3.1.6, WF on uplink power control in LAA.
R1-164918, 3GPP TSG-RAN WG1 Meeting #85, Nanjing, China, May 23-27, 2016, Agenda item: 6.2.1.1, Source Nokia, Alcatel-Lucent Shanghai Bell, Title: On PUSCH Transmit Power on LAA SCells.
R1-165557, 3GPP TSG RAN WG1 #85, Nanjing, China, May 23-27, 2016, Agenda item: 6.2.1.1, WF on uplink power control in LAA.
R1-167026, 3GPP TSG-RAN WG1 Meeting #86, Gothenburg, Sweden, Aug. 22-26, 2016, Agenda item: 7.2.1.1, Source: Nokia, Alcatel-Lucent Shanghai Bell, Title: Remaining Issues on LAA SCell PUSCH Transmit Power.
RP-141188, 3GPP TSG RAN Meeting #65, Edinburgh, Scotland, Sep. 9-12, 2014, Source: ZTE, Title: Supporting dual connectivity in LTE-U.
RP-151725, 3GPP TSG RAN Meeting #70, Sitges, Spain, Dec. 7-10, 2015, Source: ZTE, Xinwei Title: Supporting dual connectivity in LAA.
RP-151978, 3GPP TSG RAN Meeting #70, Sitges, Spain, Dec. 7-10, 2015, revision of RP-yynnnn, Source: Ericsson, Huawei, Title: New Work Item on enhanced LAA for LTE.
Rp-151979, 3GPP TSG RAN Meeting #70, Sitges, Spain, Dec. 7-10, 2015, Agenda item 14.1.1, Motivation For Enhanced Licensed Assisted Access For LTE in Rel-14.
Rp-160926, 3GPP TSG RAN Meeting #72, Busan, Korea, Jun. 13-17, 2016, Source: ZTE, Title: Discussion on further enhancement of LAA for LTE.
RP-161036, 3GPP TSG RAN Meeting #72, Busan, Korea, Mar. 13-16, 2016, Title: Motivation for New Work Item for Enhancing Utilization of CA for LTE, Source: Nokia, Alcatel-Lucent Shanghai Bell, Agenda Item: 10.1.2.
RP-161150, 3GPP TSG RAN Meeting #72, Busan, Korea, Jun. 13-16, 2016, Source: Qualcomm Incorporated Title: New WI proposal on LTE standalone and dual connectivity operation in unlicensed spectrum.
RP-161701, 3GPP TSG RAN Meeting #73, New Orleans, Sep. 19-22, 2016, Source: ZTE, Title: New WI proposal Further enhancement on FeLAA.

(56) References Cited

OTHER PUBLICATIONS

RP-161702, 3GPP TSG RAN Meeting #73, New Orleans, USA, Sep. 19-22, 2016, Motivation for New WI Further Enhancement on FeLAA.
Aug. 16, 2016—International Search Report and Written Opinion—PCT/US2016/021201.
Aug. 16, 2016—International Search Report and Written Opinion—PCT/2016/021227.
Feb. 21, 2017—European Office Action—EP16716078.7.
Samsung, "Text Proposal for PHR in dual connectivity", May 19-23, 2014, pp. 1-7, 3GPP TSG RAN WG2 #86, R2-142275, Seoul, Korea.
Japanese Office Action dated Jan. 30, 2018 in Japanese Patent Application No. 2017-546998.
R2-140066, 3GPP TSG RAN WG2 Meeting #85, Prague, Czech Republic, Feb. 10-14, 2014, Title: Consideration on PHR for TDD eiMTA.
3GPP TS 36.211 V12.4.0 (Dec. 2014), Technical Specification, 3rd Generation Partnership Project; Technical Specification Group Radio Access Network; Evolved Universal Terrestrial Radio Access (E-UTRA); Physical channels and modulation, 3GPP, Valbonne, France.
3GPP TS 36.212 V12.3.0 (Dec. 2014), Technical Specification, 3rd Generation Partnership Project; Technical Specification Group Radio Access Network; Evolved Universal Terrestrial Radio Access (E-UTRA); Multiplexing and channel coding, 3GPP, Valbonne, France.
3GPP TS 36.213 V12.4.0 (Dec. 2014), Technical Specification, 3rd Generation Partnership Project; Technical Specification Group Radio Access Network; Evolved Universal Terrestrial Radio Access (E-UTRA); Physical layer procedures, Valbonne, France.
3GPP TS 36.300 V12.4.0 (Dec. 2014), Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2, Valbonne, France.
3GPP TS 36.321 V12.4.0 (Dec. 2014), Technical Specification, 3rd Generation Partnership Project; Technical Specification Group Radio Access Network; Evolved Universal Terrestrial Radio Access (E-UTRA); Medium Access Control (MAC) protocol specification, Valbonne, France.
3GPP TS 36.331 V12.4.1 (Dec. 2014), Technical Specification, 3rd Generation Partnership Project; Technical Specification Group Radio Access Network; Evolved Universal Terrestrial Radio Access (E-UTRA); Radio Resource Control (RRC); Protocol specification, Valbonne, France.
3GPP TSG RAN meeting #67, Shanghai, China, Mar. 9-12, 2015, RP-150272, Status Report to TSG, Agenda item: 11.3.4, Title: LTE Carrier Aggregation Enhancement Beyond 5 Carriers.
3GPP TSG RAN WG1 Meeting #80 R1-150102, Athens, Greece, Feb. 9-13, 2015, Source: CATT, Title: Uplink power control to support PUCCH on SCell for Rel-13 CA.
3GPP TSG RAN WG1 Meeting #80bis R1-15xxxx, Belgrade, Serbia, Apr. 20-24, 2015, Source: MCC Support, Title Draft Report of 3GPP TSG RAN WGI #80 v0.2.0, Athens, Greece, Feb. 9-13, 2015.
3GPP TSG RAN WG2 Meeting #89 R2-150169, Athens, Greece, Feb. 9 -13, 2015, Source: Intel Corporation, Title: Considerations for PUCCH on SCell in carrier aggregation.
3GPP TSG-RAN WG1 #80 R1-150085, Athens, Greece, Feb. 9-13, 2015, Source: Intel Corporation, Title Support of PUCCH on SCell for CA.
3GPP TSG-RAN WG1#80 R1-150321, Athens, Greece, Feb. 9-13, 2015, Source: Ericsson, Title: PUCCH on SCell ar carrier aggregation.
3GPP TSG-RAN WG2 #89 R2-150112, Feb. 9-13, 2015, Athens, Greece, Source: NTT Docomo, Inc., Title Discussion on PUCCH on SCell.
3GPP TSG-RAN WG2 #89 Tdoc R2-150389, Athens, Greece, Feb. 9-13, 2015, Source: Ericsson, Title: PUCCH on SCell.

3GPP TSG-RAN WG2 Meeting #80 R1-150167, Athens, Greece, Feb. 9-13, 2015, Source: Alcatel-Lucent, Alcatel-Lucent Shanghai Bell, Title: PUCCH on SCell for CA enhancement.
3GPP TSG-RAN WG2 Meeting #89 R2-150527, Athens, Greece, Feb. 9-13, 2015, Source: Qualcomm ncorporated, Title: General principles for the support of PUCCH on SCell.
3GPP TSG-RAN WG2 Meeting #89 R2-150151, Athens, Greece, Feb. 9 -13, 2015, Source: ZTE, Title: Discussion on the impact for the support of PUCCH on SCell, Agenda item: 7.2.
3GPP TSG-RAN WG2 Meeting #89 R2-150406, Athens, Greece, Feb. 9-13, 2015, Source: Alcatel-Lucent, Alcatel-Lucent Shanghai Bell, Title: Considerations on PUCCH on SCell.
3GPP TSG-RAN WG2 Meeting #89 R2-150410, Athens, Greece, Feb. 9-13, 2015, Agenda item: 7.2, Source: Nokia Corporation, Nokia Networks, Title: PHR for SCell with PUCCH, WID/SID: LTE_CA_enh_b5G-Core- Release 13.
3GPP TSG-RAN WG2 Meeting #89 R2-150372, Athens, Greece, Feb. 9-13, 2015, Source: Huawei, HiSilicon, Title: Introduce PUCCH on SCell for CA beyond 5 carriers.
3GPP TSG RAN WG1 Meeting #81 R1-153295, Fukuoka, Japan, May 25-29, 2015, Source: Institute for Infomnation Industry (III), Title: Discussion on Dynamic Selection of SR PUCCH Resources.
3GPP TSG RAN WG2 Meeting #89 R2-150264, Athens, Greece, Feb. 9-13, 2015, Source: CATT, Title: Discussion on the functionality of PUCCH SCell.
3GPP TSG RAN WG2 Meeting RAN2#89, Athens, Greece, Feb. 9-13, 2015, R2-150403, Agenda Item: 7.2, Source: NEC, Title: PUCCH on SCell.
3GPP TSG-RAN WG2 Meeting #89 R2-150129, Athens, Greece, Feb. 9-13, 2015, Agenda Item: 7.2, Source: Nokia Networks, Nokia Corporation, Title: SR on SCell, WID/SID: LTE_CA_enh_b5C-Core Release 13.
3GPP TSG-RAN WG2 Meeting #89 R2-150278, Athens, Greece, Feb. 9-Feb. 13, 2015, Source: Microsoft Corporation, Title: SCell PUCCH for CA.
3GPP TSG-RAN WG2 Meeting #90 R2-152513, Fukuoka, Japan, May 25-29, 2015, Title: SR on PUCCH-SCell, Source to WG: Ericsson.
3GPP TSG-RAN2 Meeting #64bis, Ljubljana, Slovenia, Jan. 12-16, 2009, R2-090659, Title: S PRC Parameters for MAG and RLG, Source to WG: Nokia Siemens Networks, Nokia Corporation, Source to TSG: R2, Work item code LTE-L23.
3GPP TSG-RAN2#72 meeting TdocXR2-106513, Jacksonville, U.S. Nov. 15-19, 2010, Agenda Item: 7.1.4.3, Source: Samsung, Title: SR handling in CA.
Jan. 24, 2018—Japanese Office Action—JP 2017-546843.
Apr. 5, 2018—Korean Office Action—KR 2017-7025399.
3GPP TS 36.133 V12.6.0 (Dec. 2014), Technical Specification, 3rd Generation Partnership Project; Technical Specification Group Radio Access Network; Evolved Universal Terrestrial Radio Access (E-UTRA); Requirements for support of radio resource management, Valbonne, France.
3GPP TSG RAN WG2 Meeting #89 R2-150150, Athens, Greece, Feb. 9-13, 2015, Source: ZTE, Title: Activation/Deactivation for SCell carrying PUCCH.
3GPP TSG-RAN WG2 #87, Aug. 18-22, 2014, Dresden, Germany, R2-143073, Update of R2-141967, Source: NTT DOCOMO, INC, Title: Support of PUCCH on SCell for CA—RAN2 aspects.
3GPP TSG-RAN WG2 Meeting #72bis, Dublin, Ireland, Jan. 17-21, 2011, R2-110113, Agenda item: 7.1.4, Source: Huawei, Title: CQI Reporting at Activation.
3GPP TSG-RAN WG2 Meeting #87, Aug. 18-22, 2014, Dresden, Germany, R2-143117, Agenda Item: 6.1.2, Source: Samsung, Title: Discussion on PHR triggering due to SCell activation.
3GPP TSG-RAN WG2 Meeting #89 R2-150186, Athens, Greece, Feb. 9-13, 2015, Source: Nokia Corporation, Nokia Networks, Title: PUCCH SCell RLM and activation/deactivation.
3GPP TSG-RAN WG2 Meeting #89 R2-150277, Athens, Greece, Feb. 9-13, 2015, Source: KT Corp., Title: Activation/deactivation of SCell carrying PUCCH.
3GPP TSG-RAN WG2 Meeting#89 R2-150238, Athens, Greece, Feb. 9-13, 2015, Agenda Item: 7.2, Source: Fujitsu, Title: Discussion on the PUCCH support on SCell.

(56) References Cited

OTHER PUBLICATIONS

3GPP TSG-RAN WG4 Meeting #68, Barcelona, Spain, Aug. 19-23, 2013, R4-134045, Agenda item: 5.2.3, Source: NSN, Nokia Corporation, Title: Remaining issues on SCell Activation Delay Requirements.
3GPP TSG-RAN1#63bis meeting R1-110069, Dublin, Ireland, Jan. 17-21, 2011, Agenda Item: 6.2.1, Source: Samsung, Title: CSI reporting and SRS timing upon SCell activation/deactivation.
3GPP TSG-RAN1#64 meeting R1-110721, Taipei, Taiwan, Feb. 21-25, 2011, Agenda item: 4, Source: Samsung, Title: CQI reporting at SCell activation.
3GPP TSG-RAN WG2 Meeting #89 R2-150380, Athens, Greece, Feb. 9-Feb. 13, 2015, Source: LG Electronics Inc., Title: Potential issues in MAC for CA enhancement.
3GPP TSG RAN WG2 Meeting #89 R2-150263, Athens, Greece, Feb. 9-13, 2015, Source: CATT, Title: Introduction of PUCCH Cell Group.
3GPP TSG RAN WG1 #80 R1-150358, Athens, Greece, Feb. 9-13, 2015, Agenda item: 7.2.2.2.1, Source: Samsung, Title: Necessary mechanisms for supporting CA with up to 32 CCs.
3GPP TSG RAN WG1 #80 R1-150359, Athens, Greece, Feb. 9-13, 2015, Agenda item: 7.2.2.2.2, Source Samsung, Title: Enhancements to DL control signaling for CA with up to 32 CCs.
3GPP TSG RAN WG1 Meeting #80 R1-150104, Athens, Greece, Feb. 9-13, 2015, Source: CATT, Title: Enhancements to DL control signaling for Rel-13 CA.
3GPP TSG RAN WG1 Meeting #80 R1-150137, Athens, Greece, Feb. 9-13, 2015, Source: ZTE, Title: PDCCH/EPDCCH enhancements for Carrier Aggregation.
3GPP TSG RAN WG1 Meeting #80 R1-150169, Athens, Greece, Feb. 9-13, 2015, Agenda item: 7.2.2.2.2, Source: Alcatel-Lucent Shanghai Bell, Alcatel-Lucent, Title: Enhancements to DL control signalling for up to 32 component carriers.
3GPP TSG RAN WG1 Meeting #80 R1-150170, Athens, Greece, Feb. 9-13, 2015, Source: Alcatel-Lucent Shanghai Bell, Alcatel-Lucent, Title: DL PHICH enhancement to support up to 32 carriers aggregation.
3GPP TSG RAN WG1 Meeting #80 R1-150277, Athens, Greece, Feb. 9-13, 2015, Source: Sharp, Title: Considerations on DL Control Signaling for Rel-13 CA.
3GPP TSG RAN WG1 Meeting #80 R1-150291, Athens, Greece, Feb. 9-13, 2015, Agenda item: 7.2.2.1, Source: NEC, Title: Initial considerations on SCell PUCCH for CA.
3GPP TSG RAN WG1 Meeting #80 R1-150293, Athens, Greece, Feb. 9-13, 2015, Agenda item: 7.2.2.2.2, Source: NEC, Title: Discussion on DL control signaling enhancements.
3GPP TSG RAN WG1 Meeting #80 R1-150315, Athens, Greece, Feb. 9-13, 2015, Source: Panasonic, Title: identified DL aspects for CA beyond 5 carriers.
3GPP TSG RAN WG1 Meeting #80 R1-150437, Athens, Greece, Feb. 9-13, 2015, Source: CMCC, Title: Design principle to support CA up to 32 carriers.
3GPP TSG RAN WG1 Meeting #80 R1-150523, Athens, Greece, Feb. 9-13, 2015, Agenda item: 7.2.2.2.2, Source: HTC, Title: DL control signaling for CA up to 32 CCs.
3GPP TSG RAN WG1 Meeting #80 R1-150593, Athens, Greece, Feb. 9-13, 2015, Source: NTT DOCOMO, INC., Title: Necessary enhancements to enable LTE CA of up to 32CCs for DL and UL.
3GPP TSG RAN WG1 Meeting #80 R1-150824, Athens, Feb. 9-13, 2015, Title: Observations on Necessary Enhancements to DL control signaling, Source: Nokia Corporation, Nokia Networks, NTT DOCOMO.
3GPP TSG RAN WG2 Meeting #89 R2-150038, Athens, Greece, Feb. 9-13, 2015, Title: LS on RAN1 agreements on PUCCH on SCell for CA, Release: Rel-13, Work Item: LTE_CA_enh_b5C-Core, Source: TSG RAN WG1.
3GPP TSG-RAN WG1 Meeting #80 R1-150495, Athens, Greece, Feb. 9-13, 2015, Agenda item: 7.2.2.2.2, Source: Nokia Corporation, Nokia Networks, Title: On DL control signalling for up to 32 component carriers.

3GPP TSG-RAN WG1#80 R1-150323, Athens, Greece, Feb. 9-13, 2015, Source: Ericsson, Title: DL control signaling enhancements for up to 32 CCs.
3GPP TSG-RAN WG2 meeting #89 R2-150149, Athens, Greece, Feb. 9-13, 2015, Source: ZTE, Title: The principle of grouping PUCCH cell.
3GPP TSG-RAN2 #89 Meeting R2-150289, Athens, Greece, Feb. 9-13, 2015, Source: MediaTek Inc., Title: Cross-carrier scheduling for CA enhancement beyond 5CCs.
3GPP TSG-RAN2 #89 Meeting R2-150290, Athens, Greece, Feb. 9-13, 2015, Source: MediaTek Inc., Title: PUCCH on SCell for CA enhancement beyond 5CCs.
3GPP TSG RAN WG1 #80 R1-150357, Athens, Greece, Feb. 9-13, 2015, Agenda item: 7.2.2.1, Source: Samsung, Title: PUCCH Transmission on SCell for CA.
3GPP TSG RAN WG1 #80 R1-150361, Athens, Greece, Feb. 9-13, 2015, Agenda item: 7.2.2.2.3, Source Samsung, Title: CSI Transmission for Enhanced CA.
3GPP TSG RAN WG1 #80 R1-150468, February Feb. 9-13, 2015, Athens, Greece, Agenda item: 7.2.2.1, Source: Qualcomm Incorporated, Title: PUCCH on SCell.
3GPP TSG RAN WG1 #80 R1-150473, Feb. 9-13, 2015, Athens, Greece, Agenda item: 7.2.2.2.3, Source Qualcomm Incorporated, Title: CSI feedback for up to 32 component carriers.
3GPP TSG RAN WG1 #80 R1-150742, February Feb. 9-13, 2015, Athens, Greece, Agenda item: 7.2 2.2.3, Source: Qualcomm Incorporated, Title: HARQ ACK for up to 32 DL Carriers.
3GPP TSG RAN WG1 #80 R1-150823, Athens, Greece, Feb. 9 -13, 2015, Title: WF on PUCCH on SCell for DA, Source: NTT DOCOMO, NEC, Sharp, Softbank Mobile, Intel, Ericsson, KDDI.
3GPP TSG RAN WG1 #80, Athens, Greece, Feb. 9-13, 2015, R1-150822, Title: Way Forward on PUCCH on SCell for CA, Source: Ericsson, NEC, Sharp, NTT DOCOMO, ZTE.
3GPP TSG RAN WG1 #80, Athens, Greece, Feb. 9-13, 2015, R1-150926, Title: WF on target scenarios for UCI feedback design, Source: Ericsson, CATT.
3GPP TSG RAN WG1 Meeting #80 R1-150101, Athens, Greece, Feb. 9-13, 2015, Source: CATT, Title: PUCCH on SCell for Rel-13 CA.
3GPP TSG RAN WG1 Meeting #80 R1-150103, Athens, Greece, Feb. 9-13, 2015, Source: CATT, Title: Enhancements to support carrier aggregation with up to 32 component carriers.
3GPP TSG RAN WG1 Meeting #80 R1-150106, Athens, Greece, Feb. 9-13, 2015, Source: CATT, Title: Periodic CSI feedback for Rel-13 CA.
3GPP TSG RAN WG1 Meeting #80 R1-150168, Athens, Greece, Feb. 9-13, 2015, Source: Alcatel-Lucent Shanghai Bell, Alcatel-Lucent, Title: CA enhancement to support up to 32 carrier aggregation.
3GPP TSG RAN WG1 Meeting #80 R1-150171, Athens, Greece, Feb. 9-13, 2015, Agenda item: 7.2.2.2.2, Source: Alcatel-Lucent Shanghai Bell, Alcatel-Lucent, Title: Enhancements to UL control signalling for up to 32 component carriers.
3GPP TSG RAN WG1 Meeting #80 R1-150207, Athens, Greece, Feb. 9-13, 2015, Agenda Item: 7.2.2.2.1, Source: LG Electronics, Title: Necessary mechanisms and enhancements to support CA of up to 32 carriers.
3GPP TSG RAN WG1 Meeting #80 R1-150276, Athens, Greece, Feb. 9-13, 2015, Source: Sharp, Title: Considerations on PUCCH for Rel-13 CA.
3GPP TSG RAN WG1 Meeting #80 R1-150294, Athens, Greece, Feb. 9-13, 2015, Agenda item: 7.2.2.2.3, Source: NEC, Title: Discussion on UL control signaling enhancements.
3GPP TSG RAN WG1 Meeting #80 R1-150390, Athens, Greece, Feb. 9-13, 2015, Agenda Item: 7.2.2.2.1, Source: Huawei, HiSilicon, Title: On CA enhancements supporting up to 32 component carriers.
3GPP TSG RAN WG1 Meeting #80 R1-150412, Athens, Greece, Feb. 9-13, 2015, Agenda Item: 7.2.2.2.3, Source: Huawei, HiSilicon, Title: CSI feedback enhancement for carrier aggregation enhancement beyond 5 carriers.
3GPP TSG RAN WG1 Meeting #80 R1-150489, Athens, Greece, Nov. 17-21, 2014, Source: ITL Inc., Title: Uplink control signaling enhancements for b5C CA.

(56) References Cited

OTHER PUBLICATIONS

3GPP TSG RAN WG1 Meeting #80 R1-150509, Athens, Greece, Feb. 9-13, 2015, Source: NTT DOCOMO, INC., Title: PUCCH on SCell for UEs supporting UL-CA.
3GPP TSG RAN WG1 Meeting #80 R1-150510, Athens, Greece, Feb. 9-13, 2015, Source: NTT DOCOMO, INC., Title: Initial views on CA enhancements to support up to 32 component carriers.
3GPP TSG RAN WG1 Meeting #80 R1-150699, Athens, Greece, Feb. 9-13, 2015, Agenda item: 7.2.2.2.2, Source: Alcatel-Lucent Shanghai Bell, Alcatel-Lucent, Title: Enhancements to UL control signalling for up to 32 component carriers.
3GPP TSG RAN WG1 Meeting #80 R1-150825, Athens, Feb. 9-13, 2015, Title: Observations on Necessary Enhancements to UL control signaling, Source: Nokia Networks, Nokia Corporation, NTT DOCOMO.
3GPP TSG-RAN WG1 #80 R1-150086, Athens, Greece, Feb. 9-13, 2015, Source: Intel Corporation, Title: Discussion on CA enhancement for release 13.
3GPP TSG-RAN WG1 #80 R1-150537, Athens, Greece, Feb. 9-13, 2015, Agenda Item: 7.2.2.2.1, Source: InterDigital Communications, Title: Enabling LTE carrier aggregation of up to 32 component carriers.
3GPP TSG-RAN WG1 Meeting #80 R1-150454, Athens, Greece, Feb. 9-13, 2015, Agenda item: 7.2.2.2.3, Source: Nokia Networks, Nokia Corporation, Title: PUCCH Enhancements for Carrier Aggregation Enhancement Beyond 5 Carriers.
3GPP TSG-RAN WG1 Meeting #80 R1-150455, Athens, Greece, Feb. 9-13, 2015, Agenda item: 7 2.2.2.3, Source: Nokia Networks, Nokia Corporation, Title: CSI reporting for Carrier Aggregation Enhancement Beyond 5 Carriers.
3GPP TSG-RAN WG1#80 R1-150324, Athens, Greece, Feb. 9-13, 2015, Source: Ericsson, Title: UL control signaling enhancements for up to 32 CCs.
3GPP TSG-RAN WG2 Meeting#89 R2-150134, Feb. 9-13, 2015, Athens, Greece, Source: Institute for Information Industry (111), Title: Partition UGI feedback.
3GPP TSG RAN WG2 #89 bis R2-151304, Apr. 20-May 24, 2015, Bratislava, Slovakia, Source: ITRI, Title: Discussion on SR on PUCCH SCell.
3GPP TSG RAN WG2 #89bis R2-151637, Apr. 20-24, 2015, Bratislava, Slovakia, Source: Samsung, Title: SR support for CA enhancements.
3GPP TSG RAN WG2 #90 R2-152712, May 25-29, 2015, Fukuoka, Japan, Source: Samsung, Title: How to support SR in PUCCH SCell.
3GPP TSG RAN WG2 Meeting #89b R2-151430, Bratislava, Slovakia, Apr. 20-24, 2015, Source: NEC, Title: SR an PUCCH SCell.
3GPP TSG RAN WG2 Meeting #89bis R2-151104, Bratislava, Slovakia, Apr. 20-24, 2015, Source: Intel Corporation, Title: Control plane aspects of support PUCCH on SCell.
Jul. 9, 2018—Chinese Office Action—CN 201680014760.5.
Sep. 5, 2018—Chinese Office Action—CN 201680014404.7.
Sep. 18, 2018—Japanese Office Action—JP 2017-546998.
Nov. 23, 2018—Korean Notice of Allowance—KR 20177025339.
Feb. 22, 2019—Chinese Office Action—CN 201680014760.5.
Jun. 5, 2019—Chinese Second Office Action—CN 201680014414.7.
Jun. 18, 2019—Chinese Office Action—201680014760.5.
3GPP TS 36.321 V12.4.0 (Dec. 2014) Technical Specification3rd Generation Partnership Project; Technical Specification Group Radio Access Network; Evolved Universal Terrestrial Radio Access (E-UTRA); Medium Access Control (MAC) protocol specification (Release 12).

* cited by examiner

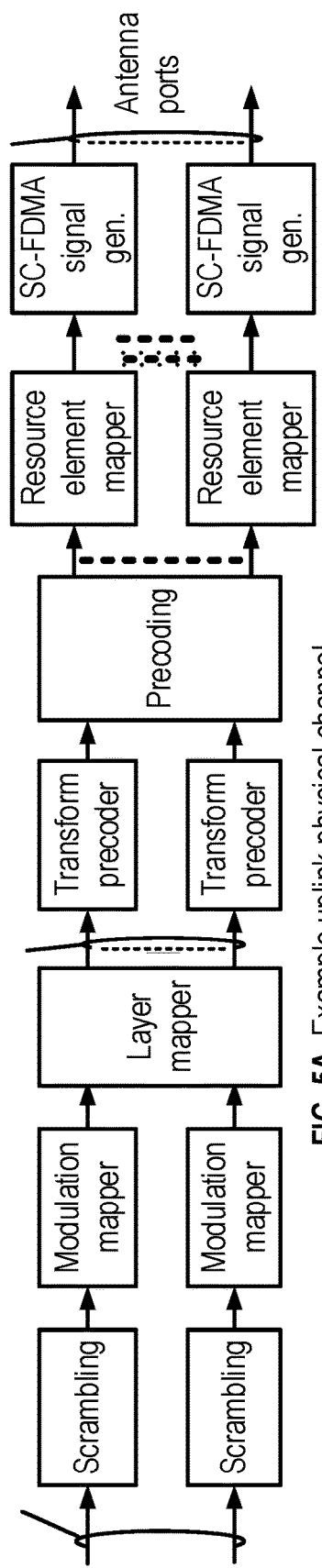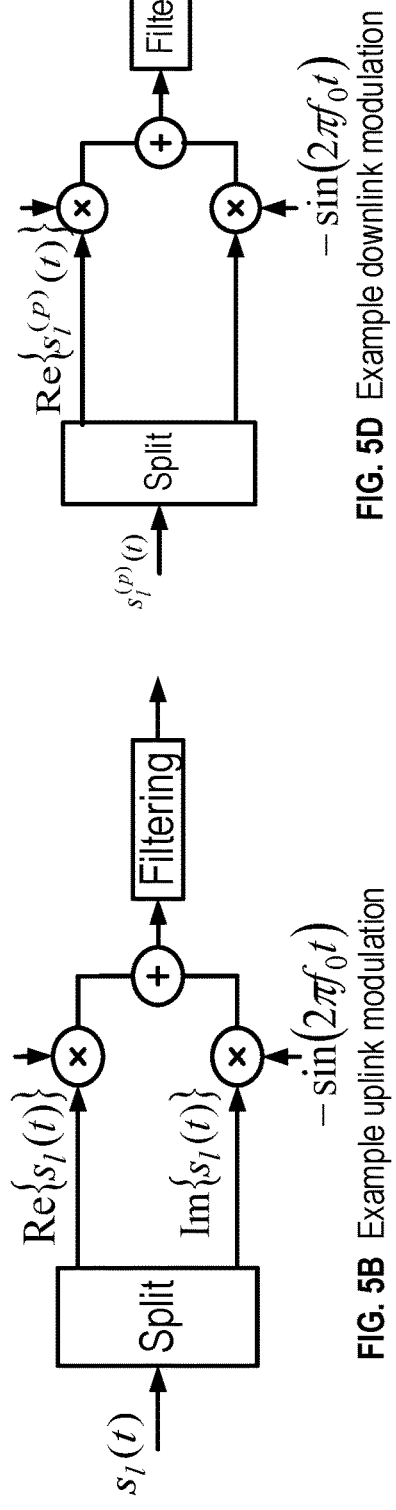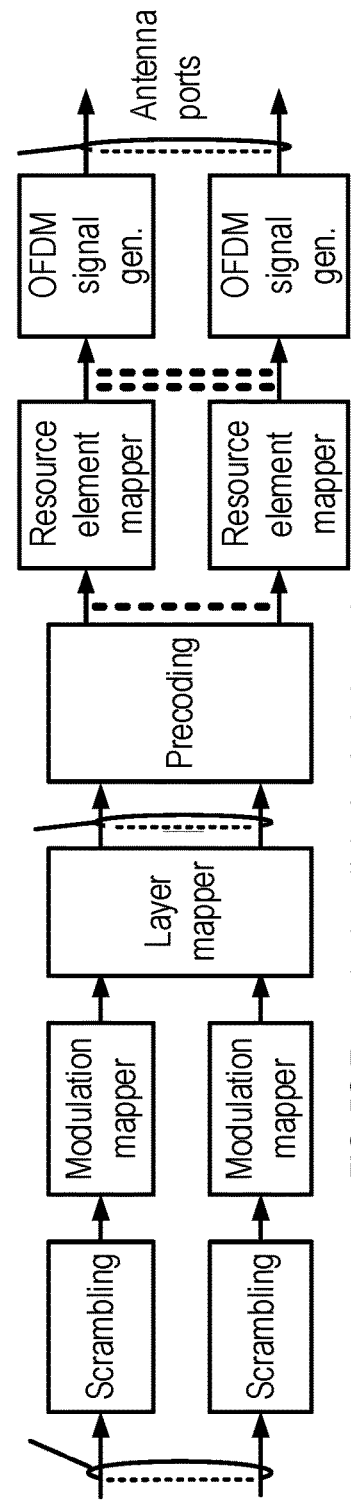
FIG. 5A Example uplink physical channel
FIG. 5B Example uplink modulation
FIG. 5C Example downlink physical channel
FIG. 5D Example downlink modulation Dual-Connectivity at eNB Dual-Connectivity- two MAC entities at UE side

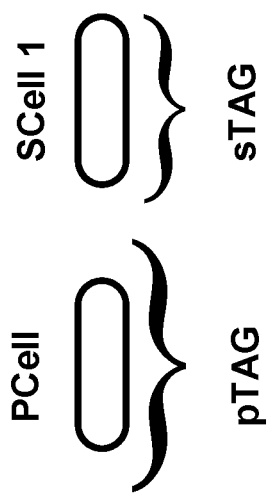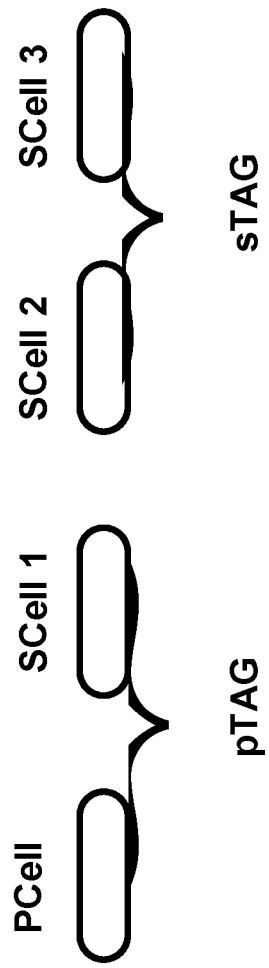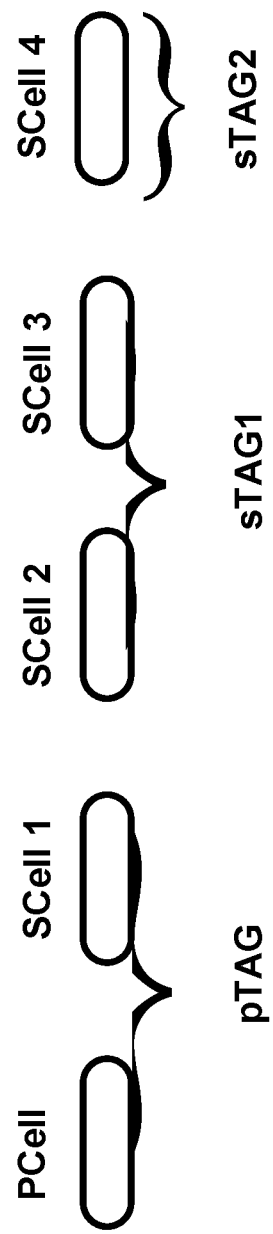
FIG. 8

POWER HEADROOM REPORT FOR A WIRELESS DEVICE AND A BASE STATION

CROSS-REFERENCE TO RELATED APPLICATIONS

This application is a continuation of U.S. patent application Ser. No. 16/245,921 filed on Jan. 11, 2019, which is a continuation of U.S. patent application Ser. No. 15/059,910, filed Mar. 3, 2016 (now U.S. Pat. No. 10,182,406), which claims the benefit of U.S. Provisional Application No. 62/130,554, filed Mar. 9, 2015. Each of the above-referenced applications is hereby incorporated by reference in its entirety.

BRIEF DESCRIPTION OF THE SEVERAL VIEWS OF THE DRAWINGS

Examples of several of the various embodiments of the present invention are described herein with reference to the drawings.

FIG. 5A, FIG. 5B, FIG. 5C and FIG. 5D are example diagrams for uplink and downlink signal transmission as per an aspect of an embodiment of the present invention.

FIG. 8 shows example TAG configurations as per an aspect of an embodiment of the present invention.

DETAILED DESCRIPTION OF EMBODIMENTS

Figure 1:
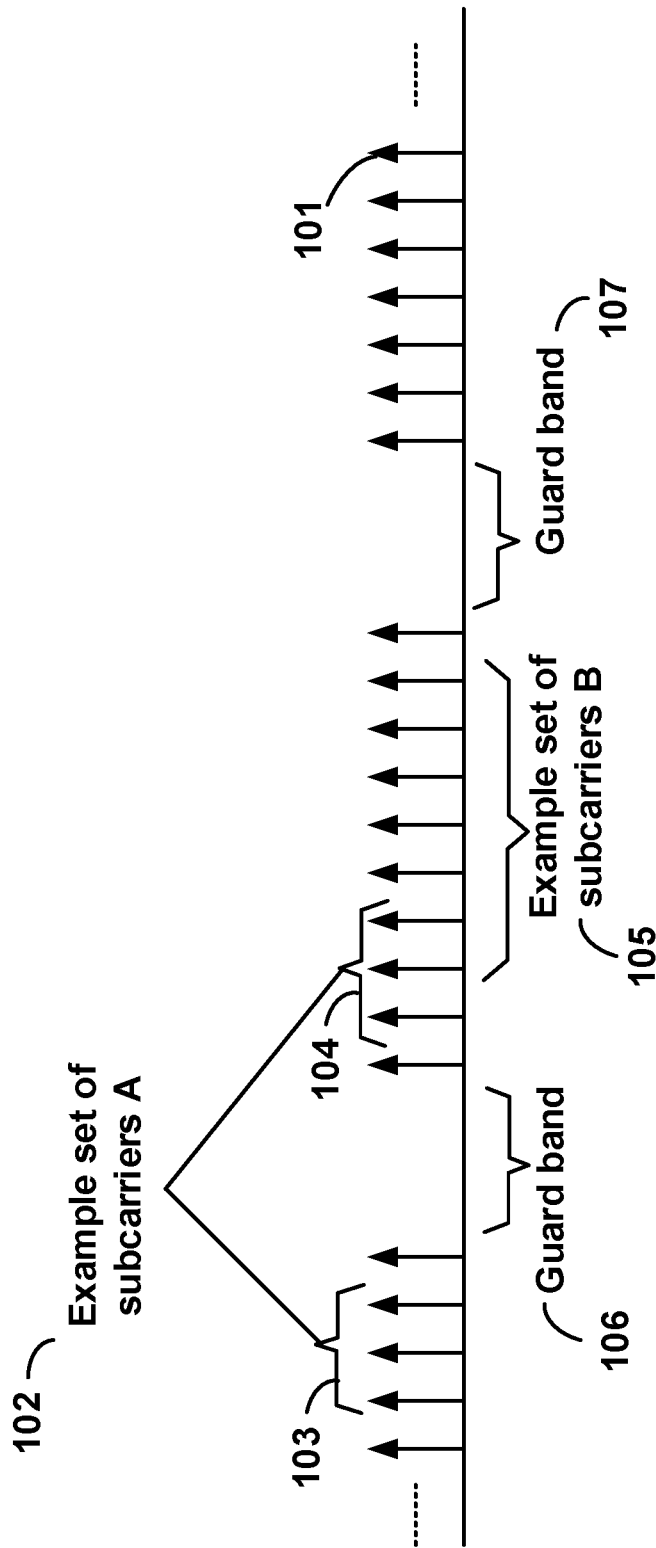
FIG. 1 is a diagram depicting example sets of OFDM subcarriers as per an aspect of an embodiment of the present invention.

Example embodiments of the present invention enable operation of multiple physical uplink control channel (PUCCH) groups. Embodiments of the technology disclosed herein may be employed in the technical field of multicarrier communication systems. More particularly, the embodiments of the technology disclosed herein may relate to operation of PUCCH groups.

The following Acronyms are used throughout the present disclosure:

| | |
|---|---|
| ASIC | application-specific integrated circuit |
| BPSK | binary phase shift keying |
| CA | carrier aggregation |
| CSI | channel state information |
| CDMA | code division multiple access |
| CSS | common search space |
| CPLD | complex programmable logic devices |
| CC | component carrier |
| DL | downlink |
| DCI | downlink control information |
| DC | dual connectivity |
| EPC | evolved packet core |
| E-UTRAN | evolved-universal terrestrial radio access network |
| FPGA | field programmable gate arrays |
| FDD | frequency division multiplexing |
| HDL | hardware description languages |
| HARQ | hybrid automatic repeat request |
| IE | information element |
| LTE | long term evolution |
| MCG | master cell group |
| MeNB | master evolved node B |
| MIB | master information block |
| MAC | media access control |
| MAC | media access control |
| MME | mobility management entity |
| NAS | non-access stratum |
| OFDM | orthogonal frequency division multiplexing |
| PDCP | packet data convergence protocol |
| PDU | packet data unit |
| PHY | physical |
| PDCCH | physical downlink control channel |
| PHICH | physical HARQ indicator channel |
| PUCCH | physical uplink control channel |
| PUSCH | physical uplink shared channel |
| PCell | primary cell |
| PCell | primary cell |
| PCC | primary component carrier |
| PSCell | primary secondary cell |
| pTAG | primary timing advance group |
| QAM | quadrature amplitude modulation |
| QPSK | quadrature phase shift keying |
| RBG | Resource Block Groups |
| RLC | radio link control |
| RRC | radio resource control |
| RA | random access |
| RB | resource blocks |
| SCC | secondary component carrier |
| SCell | secondary cell |
| Scell | secondary cells |
| SCG | secondary cell group |
| SeNB | secondary evolved node B |
| sTAGs | secondary timing advance group |
| SDU | service data unit |
| S-GW | serving gateway |
| SRB | signaling radio bearer |
| SC-OFDM | single carrier-OFDM |
| SFN | system frame number |
| SIB | system information block |
| TAI | tracking area identifier |
| TAT | time alignment timer |
| TDD | time division duplexing |
| TDMA | time division multiple access |
| TA | timing advance |
| TAG | timing advance group |
| TB | transport block |
| UL | uplink |
| UE | user equipment |
| VHDL | VHSIC hardware description language |

Example embodiments of the invention may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is a diagram depicting example sets of OFDM subcarriers as per an aspect of an embodiment of the present invention. As illustrated in this example, arrow(s) in the diagram may depict a subcarrier in a multicarrier OFDM system. The OFDM system may use technology such as OFDM technology, SC-OFDM technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
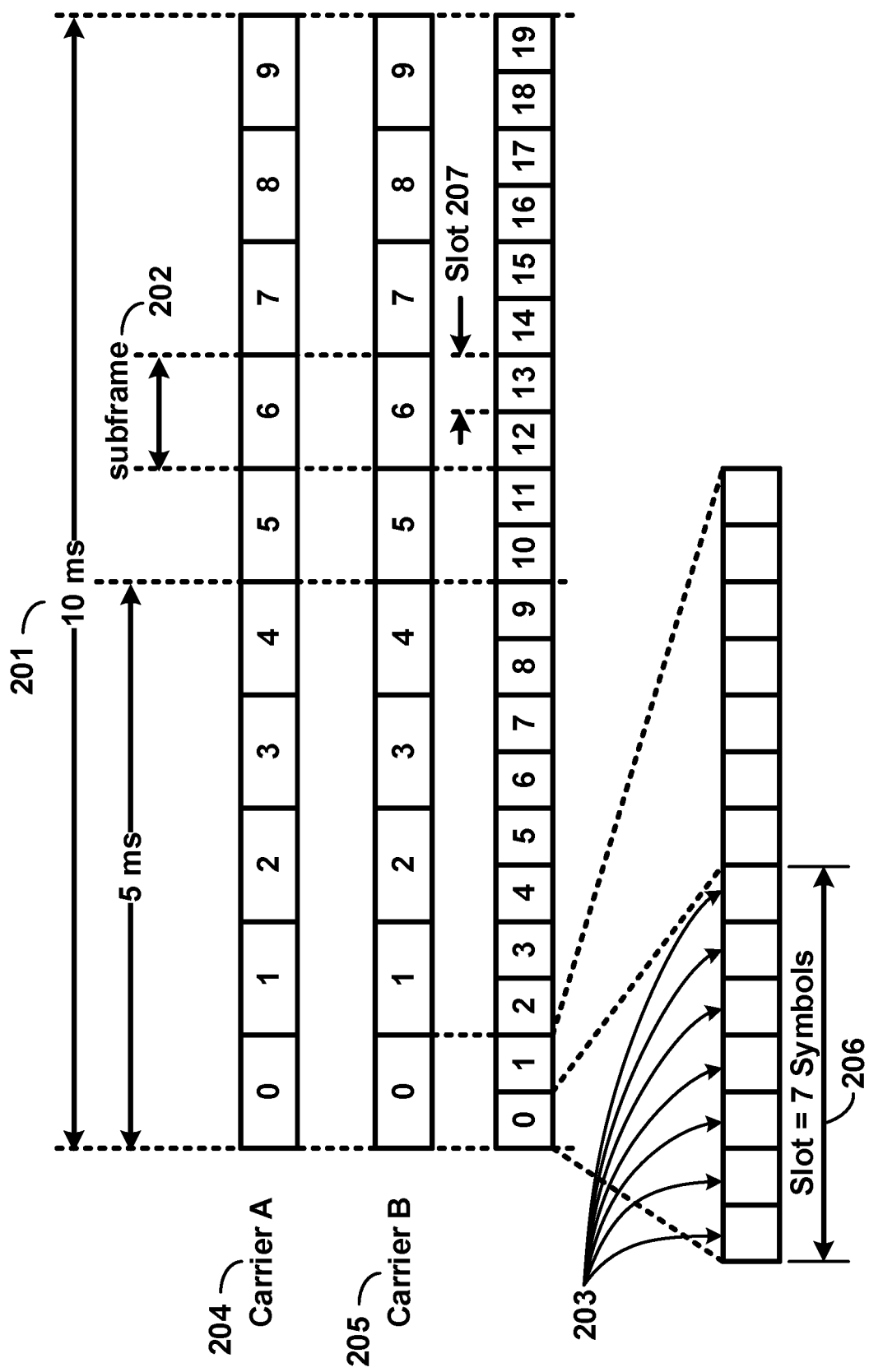
FIG. 2 is a diagram depicting an example transmission time and reception time for two carriers in a carrier group as per an aspect of an embodiment of the present invention.

FIG. 2 is a diagram depicting an example transmission time and reception time for two carriers as per an aspect of an embodiment of the present invention. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, radio frame duration is 10 msec. Other frame durations, for example, in the range of 1 to 100 msec may also be supported. In this example, each 10 ms radio frame 201 may be divided into ten equally sized subframes 202. Other subframe durations such as including 0.5 msec, 1 msec, 2 msec, and 5 msec may also be supported. Subframe(s) may consist of two or more slots (e.g. slots 206 and 207). For the example of FDD, 10 subframes may be available for downlink transmission and 10 subframes may be available for uplink transmissions in each 10 ms interval. Uplink and downlink transmissions may be separated in the frequency domain. Slot(s) may include a plurality of OFDM symbols 203. The number of OFDM symbols 203 in a slot 206 may depend on the cyclic prefix length and subcarrier spacing.

Figure 3:
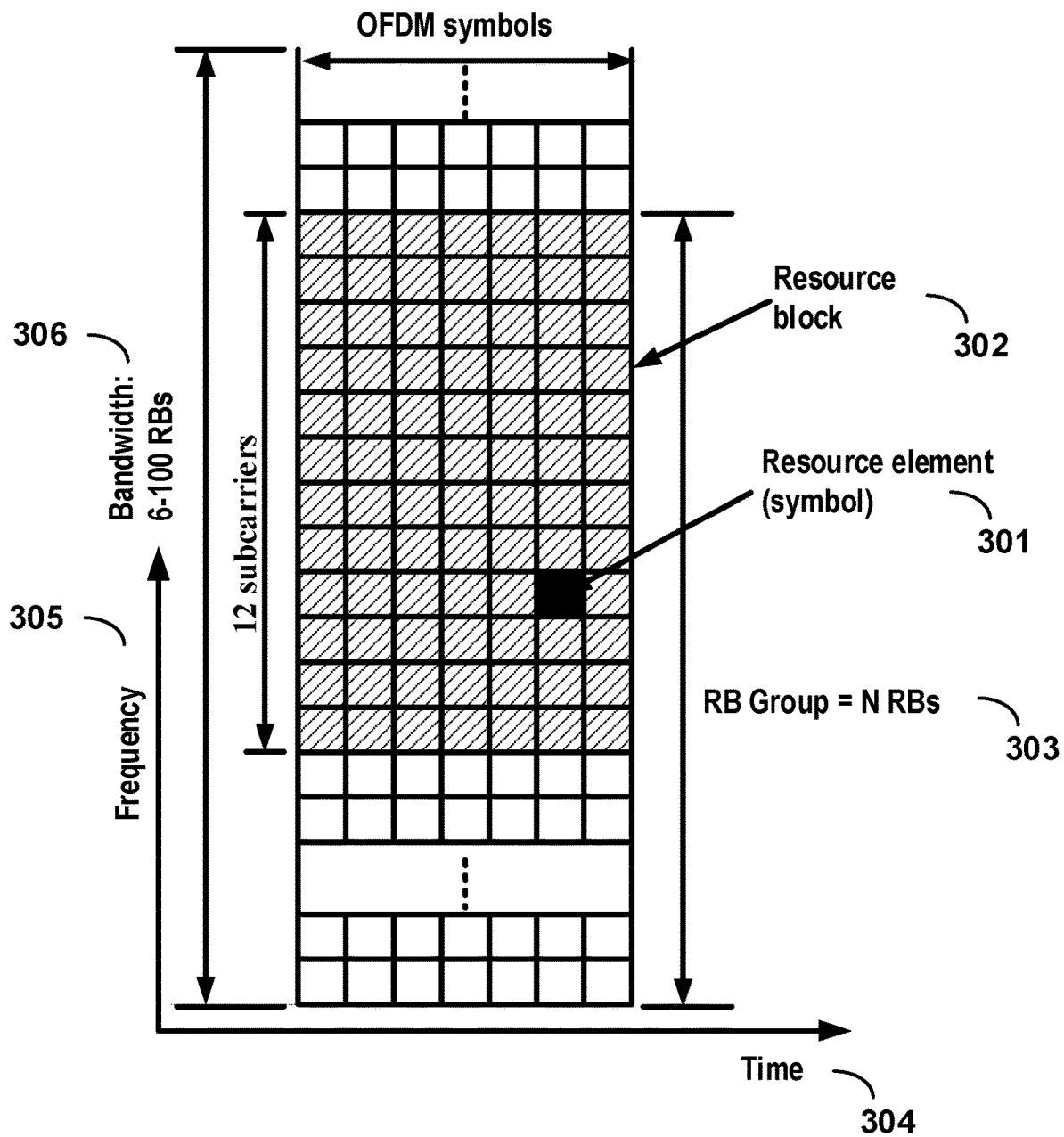
FIG. 3 is a diagram depicting OFDM radio resources as per an aspect of an embodiment of the present invention.

FIG. 3 is a diagram depicting OFDM radio resources as per an aspect of an embodiment of the present invention. The resource grid structure in time 304 and frequency 305 is illustrated in FIG. 3. The quantity of downlink subcarriers or RBs (in this example 6 to 100 RBs) may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. In an illustrative example, a resource block may correspond to one slot in the time domain and 180 kHz in the frequency domain (for 15 KHz subcarrier bandwidth and 12 subcarriers).

FIG. 5A, FIG. 5B, FIG. 5C and FIG. 5D are example diagrams for uplink and downlink signal transmission as per an aspect of an embodiment of the present invention. FIG. 5A shows an example uplink physical channel. The baseband signal representing the physical uplink shared channel may perform the following processes. These functions are illustrated as examples and it is anticipated that other mechanisms may be implemented in various embodiments. The functions may comprise scrambling, modulation of scrambled bits to generate complex-valued symbols, mapping of the complex-valued modulation symbols onto one or several transmission layers, transform precoding to generate complex-valued symbols, precoding of the complex-valued symbols, mapping of precoded complex-valued symbols to resource elements, generation of complex-valued time-domain SC-FDMA signal for each antenna port, and/or the like.

Example modulation and up-conversion to the carrier frequency of the complex-valued SC-FDMA baseband signal for each antenna port and/or the complex-valued PRACH baseband signal is shown in FIG. 5B. Filtering may be employed prior to transmission.

An example structure for Downlink Transmissions is shown in FIG. 5C. The baseband signal representing a downlink physical channel may perform the following processes. These functions are illustrated as examples and it is anticipated that other mechanisms may be implemented in various embodiments. The functions include scrambling of coded bits in each of the codewords to be transmitted on a physical channel; modulation of scrambled bits to generate complex-valued modulation symbols; mapping of the complex-valued modulation symbols onto one or several transmission layers; precoding of the complex-valued modulation symbols on each layer for transmission on the antenna ports; mapping of complex-valued modulation symbols for each antenna port to resource elements; generation of complex-valued time-domain OFDM signal for each antenna port, and/or the like.

Example modulation and up-conversion to the carrier frequency of the complex-valued OFDM baseband signal for each antenna port is shown in FIG. 5D. Filtering may be employed prior to transmission.

Figure 4:
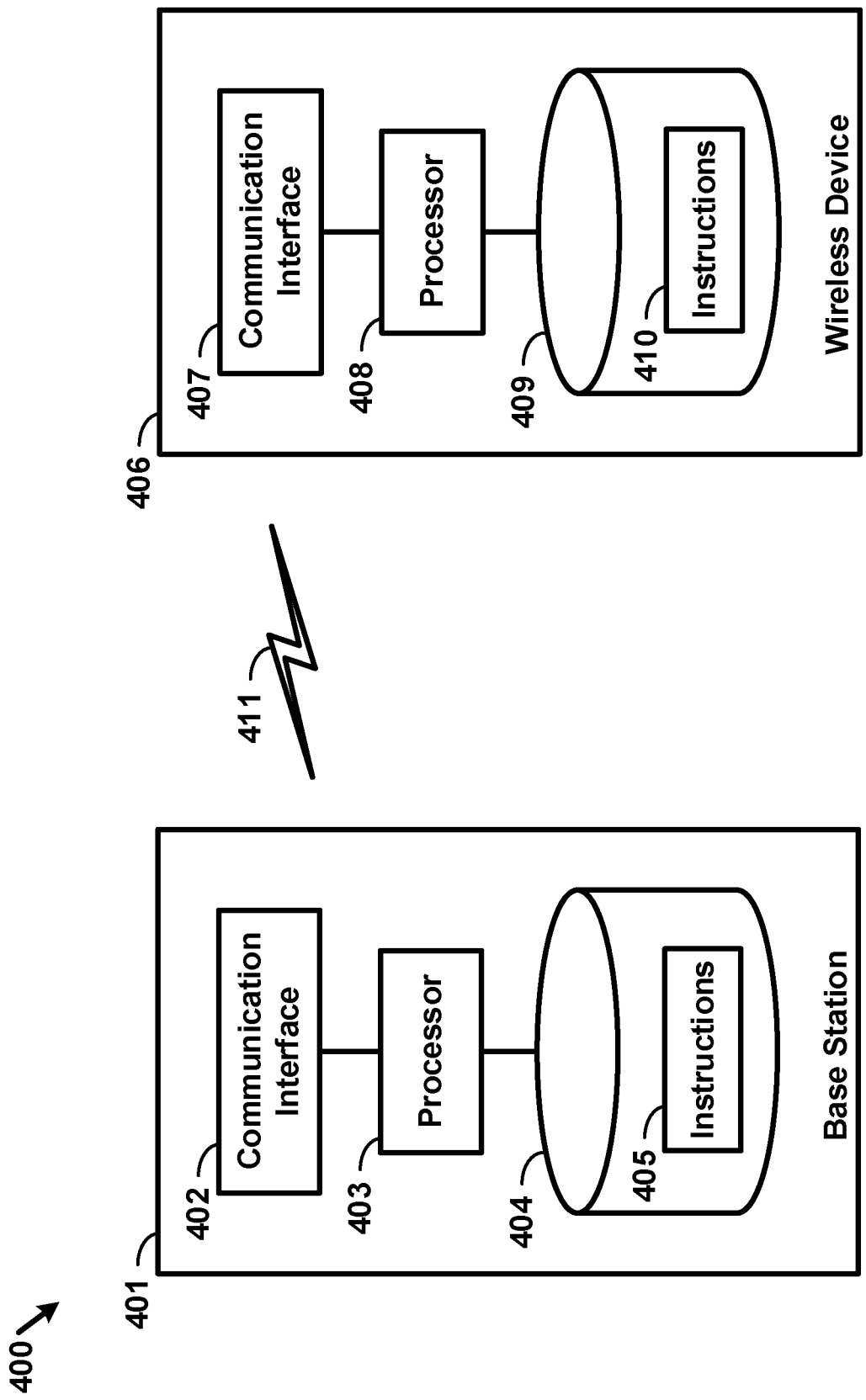
FIG. 4 is a block diagram of a base station and a wireless device as per an aspect of an embodiment of the present invention.

FIG. 4 is an example block diagram of a base station 401 and a wireless device 406, as per an aspect of an embodiment of the present invention. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to some of the various aspects of embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, FIG. 3, FIG. 5, and associated text.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics in the device, whether the device is in an operational or non-operational state.

According to some of the various aspects of embodiments, an LTE network may include a multitude of base stations, providing a user plane PDCP/RLC/MAC/PHY and control plane (RRC) protocol terminations towards the wireless device. The base station(s) may be interconnected with other base station(s) (e.g. employing an X2 interface). The base stations may also be connected employing, for example, an S1 interface to an EPC. For example, the base stations may be interconnected to the MME employing the S1-MME interface and to the S-G) employing the S1-U interface. The S1 interface may support a many-to-many relation between MMEs/Serving Gateways and base stations. A base station may include many sectors for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g. TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, it may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, when the specification refers to a first physical cell ID for a first downlink carrier, the specification may mean the first physical cell ID is for a cell comprising the first downlink carrier. The same concept may apply to, for example, carrier activation. When the specification indicates that a first carrier is activated, the specification may equally mean that the cell comprising the first carrier is activated.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices may support multiple technologies, and/or multiple releases of the same technology. Wireless devices may have some specific capability(ies) depending on its wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE technology.

Figure 6:
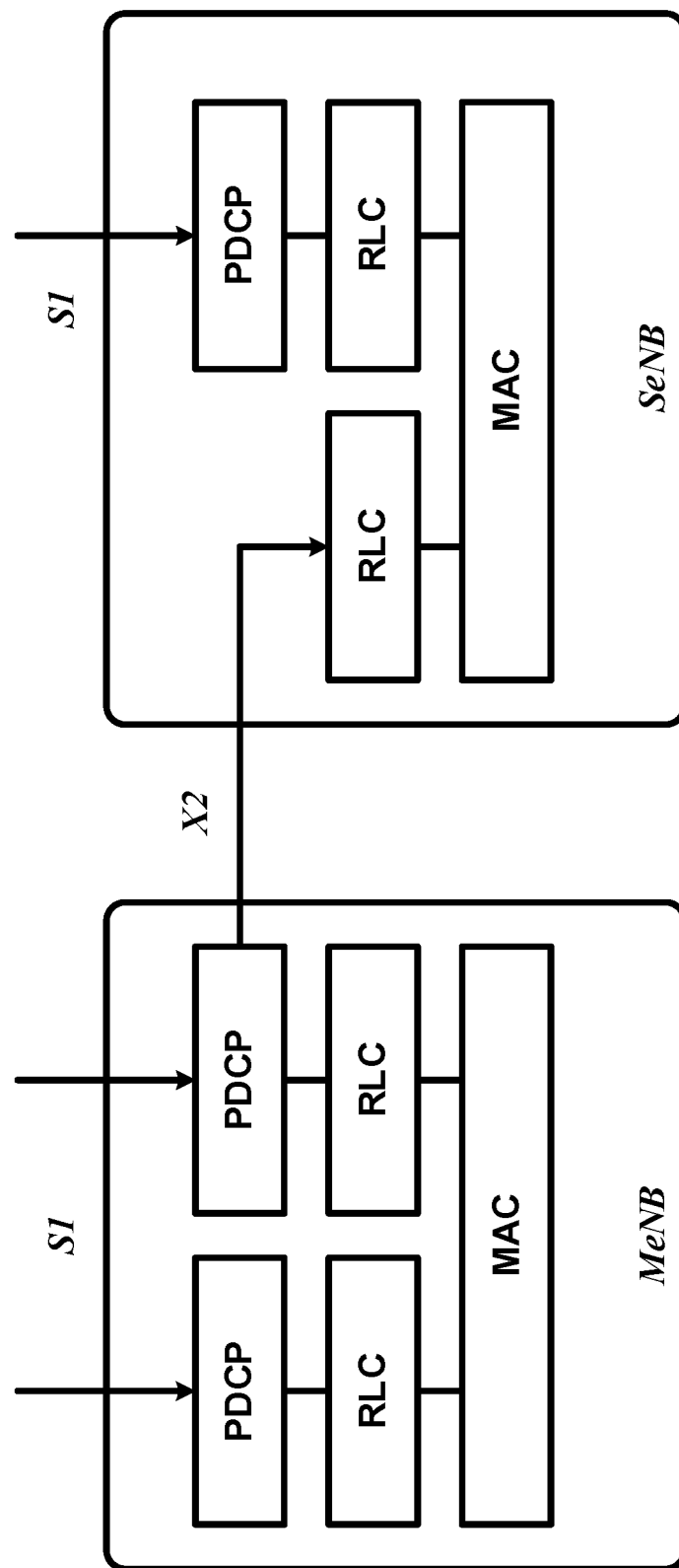
FIG. 6 is an example diagram for a protocol structure with CA and DC as per an aspect of an embodiment of the present invention.
Figure 7:
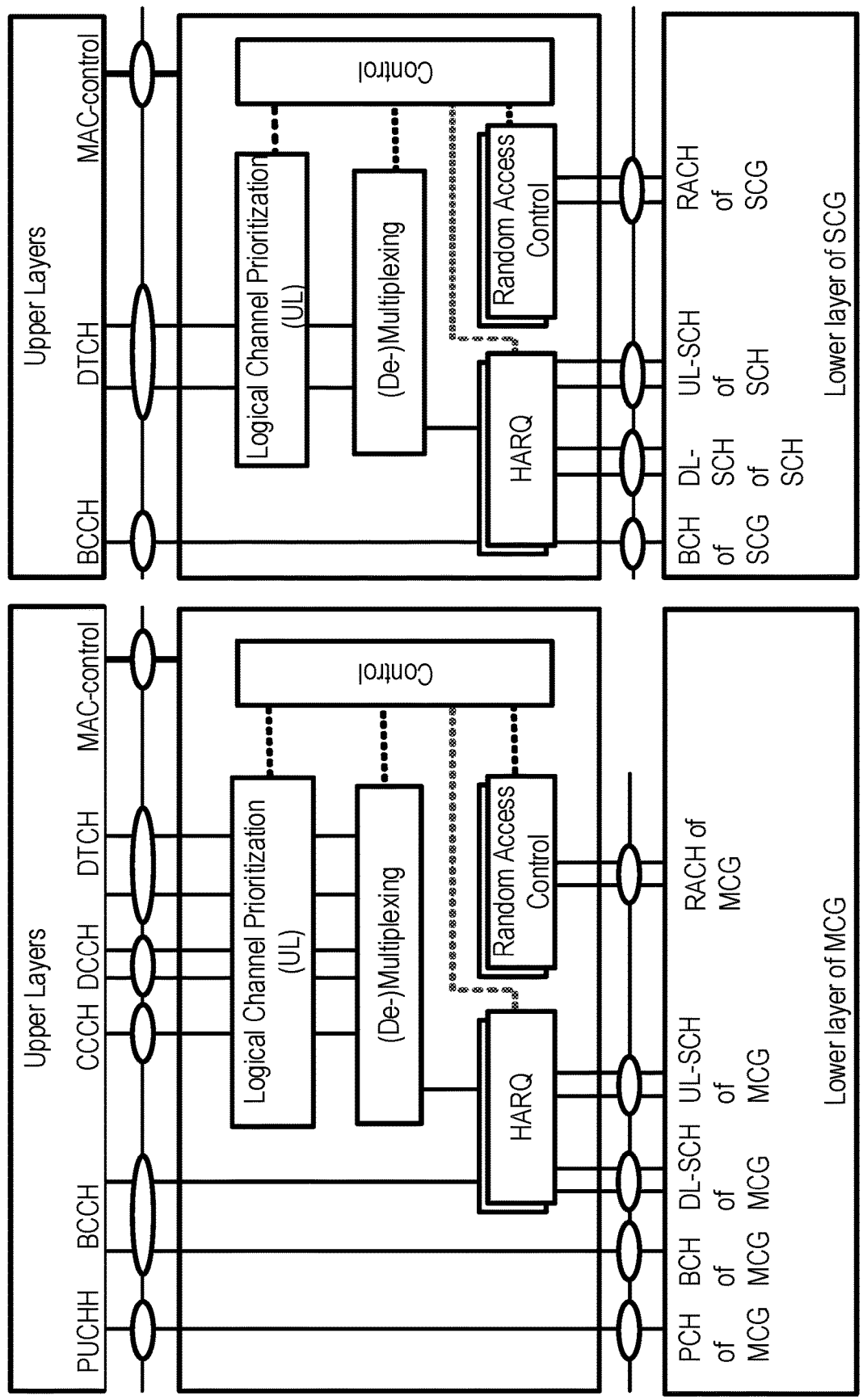
FIG. 7 is an example diagram for a protocol structure with CA and DC as per an aspect of an embodiment of the present invention.

FIG. 6 and FIG. 7 are example diagrams for protocol structure with CA and DC as per an aspect of an embodiment of the present invention. E-UTRAN may support Dual Connectivity (DC) operation whereby a multiple RX/TX UE in RRC_CONNECTED may be configured to utilize radio resources provided by two schedulers located in two eNBs connected via a non-ideal backhaul over the X2 interface. eNBs involved in DC for a certain UE may assume two different roles: an eNB may either act as an MeNB or as an SeNB. In DC a UE may be connected to one MeNB and one SeNB. Mechanisms implemented in DC may be extended to cover more than two eNBs. FIG. 7 illustrates one example structure for the UE side MAC entities when a Master Cell Group (MCG) and a Secondary Cell Group (SCG) are configured, and it may not restrict implementation. Media Broadcast Multicast Service (MBMS) reception is not shown in this figure for simplicity.

In DC, the radio protocol architecture that a particular bearer uses may depend on how the bearer is setup. Three alternatives may exist, an MCG bearer, an SCG bearer and a split bearer as shown in FIG. 6. RRC may be located in MeNB and SRBs may be configured as a MCG bearer type and may use the radio resources of the MeNB. DC may also be described as having at least one bearer configured to use radio resources provided by the SeNB. DC may or may not be configured/implemented in example embodiments of the invention.

In the case of DC, the UE may be configured with two MAC entities: one MAC entity for MeNB, and one MAC entity for SeNB. In DC, the configured set of serving cells for a UE may comprise of two subsets: the Master Cell Group (MCG) containing the serving cells of the MeNB, and the Secondary Cell Group (SCG) containing the serving cells of the SeNB. For a SCG, one or more of the following may be applied: at least one cell in the SCG has a configured UL CC and one of them, named PSCell (or PCell of SCG, or sometimes called PCell), is configured with PUCCH resources; when the SCG is configured, there may be at least one SCG bearer or one Split bearer; upon detection of a physical layer problem or a random access problem on a PSCell, or the maximum number of RLC retransmissions has been reached associated with the SCG, or upon detection of an access problem on a PSCell during a SCG addition or a SCG change: a RRC connection re-establishment procedure may not be triggered, UL transmissions towards cells of the SCG are stopped, a MeNB may be informed by the UE of a SCG failure type, for split bearer, the DL data transfer over the MeNB is maintained; the RLC AM bearer may be configured for the split bearer; like PCell, PSCell may not be de-activated; PSCell may be changed with a SCG change (e.g. with security key change and a RACH procedure); and/or neither a direct bearer type change between a Split bearer and a SCG bearer nor simultaneous configuration of a SCG and a Split bearer are supported.

With respect to the interaction between a MeNB and a SeNB, one or more of the following principles may be applied: the MeNB may maintain the RRM measurement configuration of the UE and may, (e.g, based on received measurement reports or traffic conditions or bearer types), decide to ask a SeNB to provide additional resources (serving cells) for a UE; upon receiving a request from the MeNB, a SeNB may create a container that may result in the configuration of additional serving cells for the UE (or decide that it has no resource available to do so); for UE capability coordination, the MeNB may provide (part of) the AS configuration and the UE capabilities to the SeNB; the MeNB and the SeNB may exchange information about a UE configuration by employing of RRC containers (inter-node messages) carried in X2 messages; the SeNB may initiate a reconfiguration of its existing serving cells (e.g., PUCCH towards the SeNB); the SeNB may decide which cell is the PSCell within the SCG; the MeNB may not change the content of the RRC configuration provided by the SeNB; in the case of a SCG addition and a SCG SCell addition, the MeNB may provide the latest measurement results for the SCG cell(s); both a MeNB and a SeNB may know the SFN and subframe offset of each other by OAM, (e.g., for the purpose of DRX alignment and identification of a measurement gap). In an example, when adding a new SCG SCell, dedicated RRC signalling may be used for sending required system information of the cell as for CA, except for the SFN acquired from a MIB of the PSCell of a SCG.

According to some of the various aspects of embodiments, serving cells having an uplink to which the same time alignment (TA) applies may be grouped in a TA group (TAG). Serving cells in one TAG may use the same timing reference. For a given TAG, user equipment (UE) may use one downlink carrier as a timing reference at a given time. The UE may use a downlink carrier in a TAG as a timing reference for that TAG. For a given TAG, a UE may synchronize uplink subframe and frame transmission timing of uplink carriers belonging to the same TAG. According to some of the various aspects of embodiments, serving cells having an uplink to which the same TA applies may correspond to serving cells hosted by the same receiver. A TA group may comprise at least one serving cell with a configured uplink. A UE supporting multiple TAs may support two or more TA groups. One TA group may contain the PCell and may be called a primary TAG (pTAG). In a multiple TAG configuration, at least one TA group may not contain the PCell and may be called a secondary TAG (sTAG). Carriers within the same TA group may use the same TA value and the same timing reference. When DC is configured, cells belonging to a cell group (MCG or SCG) may be grouped into multiple TAGs including a pTAG and one or more sTAGs.

FIG. 8 shows example TAG configurations as per an aspect of an embodiment of the present invention. In Example 1, pTAG comprises PCell, and an sTAG comprises SCell1. In Example 2, a pTAG comprises a PCell and SCell1, and an sTAG comprises SCell2 and SCell3. In Example 3, pTAG comprises PCell and SCell1, and an sTAG1 includes SCell2 and SCell3, and sTAG2 comprises SCell4. Up to four TAGs may be supported in a cell group (MCG or SCG) and other example TAG configurations may also be provided. In various examples in this disclosure, example mechanisms are described for a pTAG and an sTAG. The operation with one example sTAG is described, and the same operation may be applicable to other sTAGs. The example mechanisms may be applied to configurations with multiple sTAGs.

According to some of the various aspects of embodiments, TA maintenance, pathloss reference handling and a timing reference for a pTAG may follow LTE release 10 principles in the MCG and/or SCG. The UE may need to measure downlink pathloss to calculate uplink transmit power. A pathloss reference may be used for uplink power control and/or transmission of random access preamble(s). UE may measure downlink pathloss using signals received on a pathloss reference cell. For SCell(s) in a pTAG, the choice of a pathloss reference for cells may be selected from and/or be limited to the following two options: a) the downlink SCell linked to an uplink SCell using system information block 2 (SIB2), and b) the downlink pCell. The pathloss reference for SCells in a pTAG may be configurable using RRC message(s) as a part of an SCell initial configuration and/or reconfiguration. According to some of the various aspects of embodiments, a PhysicalConfigDedicatedSCell information element (IE) of an SCell configuration may include a pathloss reference SCell (downlink carrier) for an SCell in a pTAG. The downlink SCell linked to an uplink SCell using system information block 2 (SIB2) may be referred to as the SIB2 linked downlink of the SCell. Different TAGs may operate in different bands. For an uplink carrier in an sTAG, the pathloss reference may be only configurable to the downlink SCell linked to an uplink SCell using the system information block 2 (SIB2) of the SCell.

To obtain initial uplink (UL) time alignment for an sTAG, an eNB may initiate an RA procedure. In an sTAG, a UE may use one of any activated SCells from this sTAG as a timing reference cell. In an example embodiment, the timing reference for SCells in an sTAG may be the SIB2 linked downlink of the SCell on which the preamble for the latest RA procedure was sent. There may be one timing reference and one time alignment timer (TAT) per TA group. A TAT for TAGs may be configured with different values. In a MAC entity, when a TAT associated with a pTAG expires: all TATs may be considered as expired, the UE may flush HARQ buffers of serving cells, the UE may clear any configured downlink assignment/uplink grants, and the RRC in the UE may release PUCCH/SRS for all configured serving cells. When the pTAG TAT is not running, an sTAG TAT may not be running. When the TAT associated with an sTAG expires: a) SRS transmissions may be stopped on the corresponding SCells, b) SRS RRC configuration may be released, c) CSI reporting configuration for corresponding SCells may be maintained, and/or d) the MAC in the UE may flush the uplink HARQ buffers of the corresponding SCells.

An eNB may initiate an RA procedure via a PDCCH order for an activated SCell. This PDCCH order may be sent on a scheduling cell of this SCell. When cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
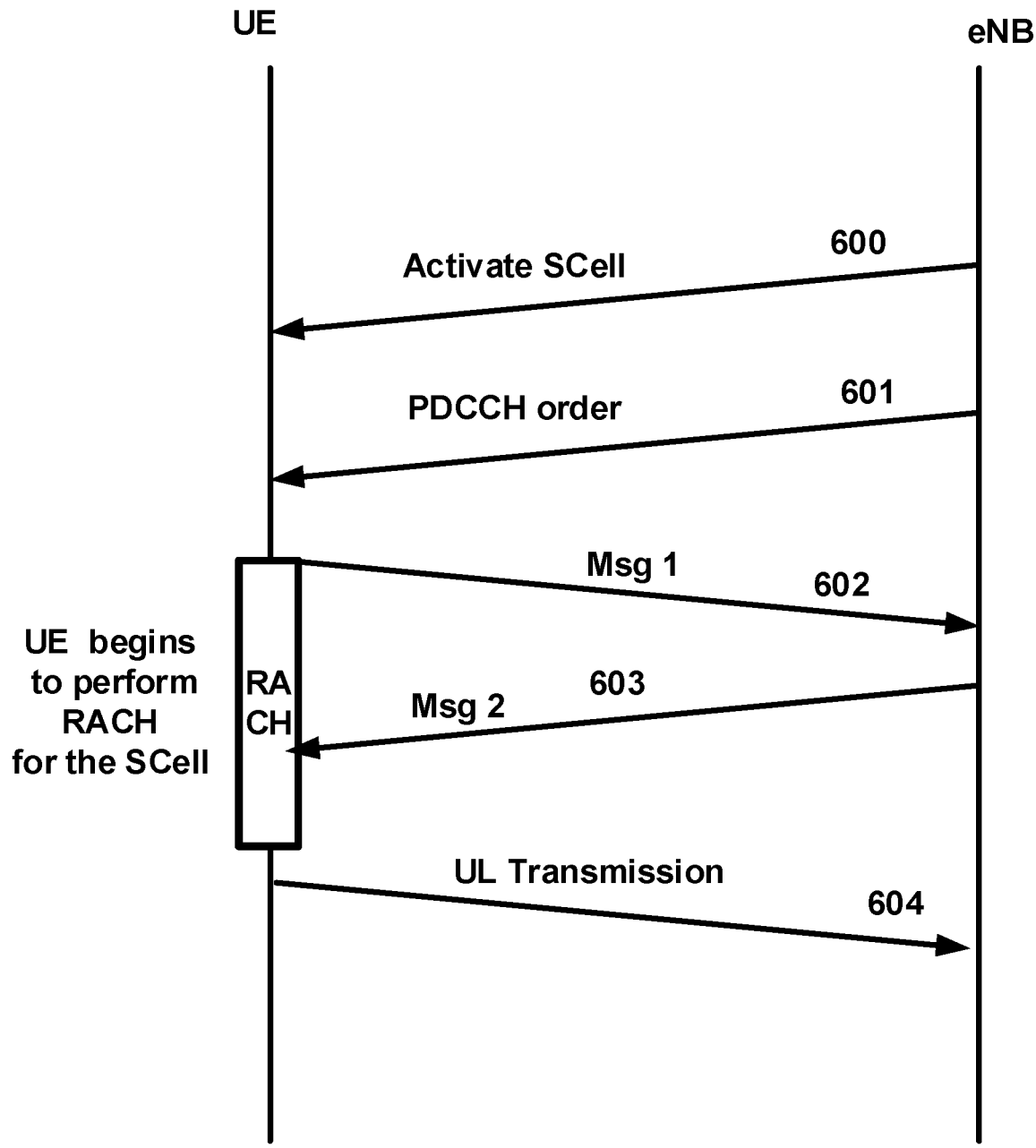
FIG. 9 is an example message flow in a random access process in a secondary TAG as per an aspect of an embodiment of the present invention.

FIG. 9 is an example message flow in a random access process in a secondary TAG as per an aspect of an embodiment of the present invention. An eNB transmits an activation command 600 to activate an SCell. A preamble 602 (Msg1) may be sent by a UE in response to a PDCCH order 601 on an SCell belonging to an sTAG. In an example embodiment, preamble transmission for SCells may be controlled by the network using PDCCH format 1A. Msg2 message 603 (RAR: random access response) in response to the preamble transmission on the SCell may be addressed to RA-RNTI in a PCell common search space (CSS). Uplink packets 604 may be transmitted on the SCell in which the preamble was transmitted.

According to some of the various aspects of embodiments, initial timing alignment may be achieved through a random access procedure. This may involve a UE transmitting a random access preamble and an eNB responding with an initial TA command NTA (amount of timing advance) within a random access response window. The start of the random access preamble may be aligned with the start of a corresponding uplink subframe at the UE assuming NTA=0. The eNB may estimate the uplink timing from the random access preamble transmitted by the UE. The TA command may be derived by the eNB based on the estimation of the difference between the desired UL timing and the actual UL timing. The UE may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. According to some of the various aspects of embodiments, when an eNB performs an SCell addition configuration, the related TAG configuration may be configured for the SCell. In an example embodiment, an eNB may modify the TAG configuration of an SCell by removing (releasing) the SCell and adding(configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In an example implementation, it may not be possible to change the TAG associated with an SCell, but rather, the SCell may need to be removed and a new SCell may need to be added with another TAG. For example, if there is a need to move an SCell from an sTAG to a pTAG, at least one RRC message, for example, at least one RRC reconfiguration message, may be send to the UE to reconfigure TAG configurations by releasing the SCell and then configuring the SCell as a part of the pTAG (when an SCell is added/configured without a TAG index, the SCell may be explicitly assigned to the pTAG). The PCell may not change its TA group and may always be a member of the pTAG.

The purpose of an RRC connection reconfiguration procedure may be to modify an RRC connection, (e.g. to establish, modify and/or release RBs, to perform handover, to setup, modify, and/or release measurements, to add, modify, and/or release SCells). If the received RRC Connection Reconfiguration message includes the sCellToReleaseList, the UE may perform an SCell release. If the received RRC Connection Reconfiguration message includes the sCellToAddModList, the UE may perform SCell additions or modification.

In LTE Release-10 and Release-11 CA, a PUCCH is only transmitted on the PCell (PSCell) to an eNB. In LTE-Release 12 and earlier, a UE may transmit PUCCH information on one cell (PCell or PSCell) to a given eNB.

Figure 10:
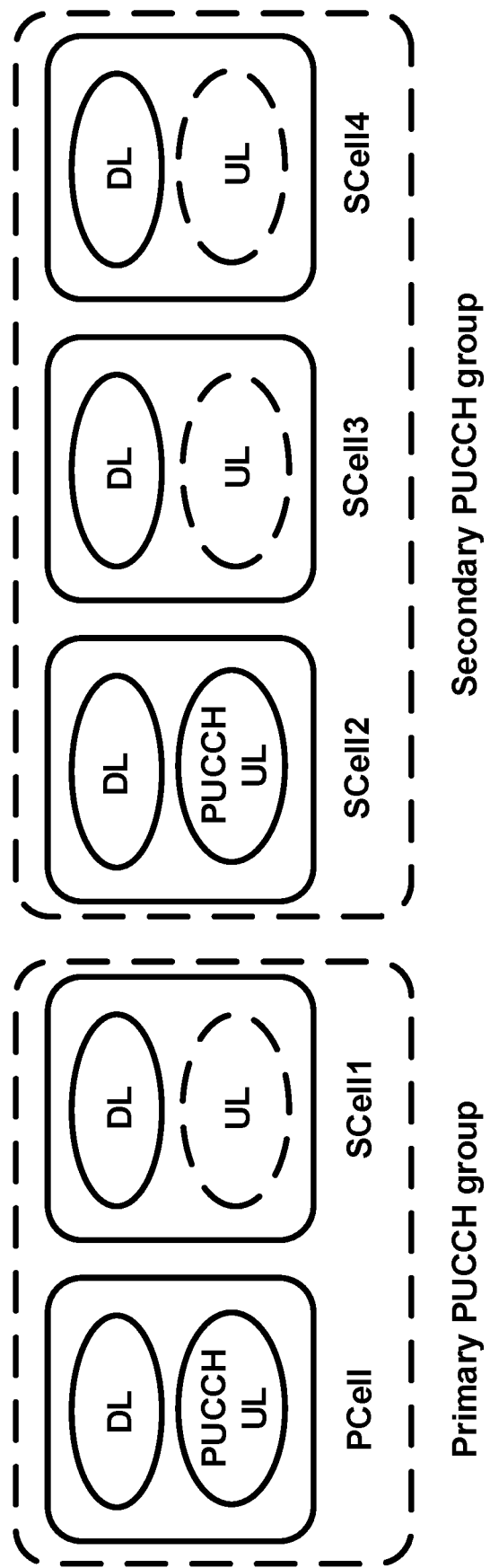
FIG. 10 is an example grouping of cells into PUCCH groups as per an aspect of an embodiment of the present invention.

As the number of CA capable UEs and also the number of aggregated carriers increase, the number of PUCCHs and also the PUCCH payload size may increase. Accommodating the PUCCH transmissions on the PCell may lead to a high PUCCH load on the PCell. A PUCCH on an SCell may be introduced to offload the PUCCH resource from the PCell. More than one PUCCH may be configured for example, a PUCCH on a PCell and another PUCCH on an SCell. FIG. 10 is an example grouping of cells into PUCCH groups as per an aspect of an embodiment of the present invention. In the example embodiments, one, two or more cells may be configured with PUCCH resources for transmitting CSI/ACK/NACK to a base station. Cells may be grouped into multiple PUCCH groups, and one or more cell within a group may be configured with a PUCCH. In an example configuration, one SCell may belong to one PUCCH group. SCells with a configured PUCCH transmitted to a base station may be called a PUCCH SCell, and a cell group with a common PUCCH resource transmitted to the same base station may be called a PUCCH group.

In Release-12, a PUCCH can be configured on a PCell and/or a PSCell, but cannot be configured on other SCells. In an example embodiment, a UE may transmit a message indicating that the UE supports PUCCH configuration on a PCell and SCell. Such an indication may be separate from an indication of of dual connectivity support by the UE. In an example embodiment, a UE may support both DC and PUCCH groups. In an example embodiment, either DC or PUCCH groups may be configured, but not both. In another example embodiment, more complicated configurations comprising both DC and PUCCH groups may be supported.

When a UE is capable of configuring PUCCH groups, and if a UE indicates that it supports simultaneous PUCCH/PUSCH transmission capability, it may imply that the UE supports simultaneous PUCCH/PUSCH transmission on both PCell and SCell. When multiple PUCCH groups are configured, a PUCCH may be configured or not configured with simultaneous PUCCH/PUSCH transmission.

In an example embodiment, PUCCH transmission to a base station on two serving cells may be realized as shown in FIG. 10. A first group of cells may employ a PUCCH on the PCell and may be called PUCCH group 1 or a primary PUCCH group. A second group of cells may employ a PUCCH on an SCell and may be called PUCCH group 2 or a secondary PUCCH group. One, two or more PUCCH groups may be configured. In an example, cells may be grouped into two PUCCH groups, and each PUCCH group may include a cell with PUCCH resources. A PCell may provide PUCCH resources for the primary PUCCH group and an SCell in the secondary PUCCH group may provide PUCCH resources for the cells in the secondary PUCCH group. In an example embodiment, no cross-carrier scheduling between cells in different PUCCH groups may be configured. When cross-carrier scheduling between cells in different PUCCH groups is not configured, ACK/NACK on PHICH channel may be limited within a PUCCH group. Both downlink and uplink scheduling activity may be separate between cells belonging to different PUCCH groups.

A PUCCH on an SCell may carry HARQ-ACK and CSI information. A PCell may be configured with PUCCH resources. In an example embodiment, RRC parameters for an SCell PUCCH Power Control for a PUCCH on an SCell may be different from those of a PCell PUCCH. A Transmit Power Control command for a PUCCH on an SCell may be transmitted in DCI(s) on the SCell carrying the PUCCH.

UE procedures on a PUCCH transmission may be different and/or independent between PUCCH groups. For example, determination of DL HARQ-ACK timing, PUCCH resource determination for HARQ-ACK and/or CSI, Higher-layer configuration of simultaneous HARQ-ACK+CSI on a PUCCH, Higher-layer configuration of simultaneous HARQ-ACK+SRS in one subframe may be configured differently for a PUCCH PCell and a PUCCH SCell.

A PUCCH group may be a group of serving cells configured by a RRC and use the same serving cell in the group for transmission of a PUCCH. A Primary PUCCH group may be a PUCCH group containing a PCell. A secondary PUCCH group may be a PUCCH cell group not containing the PCell. In an example embodiment, an SCell may belong to one PUCCH group. When one SCell belongs to a PUCCH group, ACK/NACK or CSI for that SCell may be transmitted over the PUCCH in that PUCCH group (over PUCCH SCell or PUCCH PCell). A PUCCH on an SCell may reduce the PUCCH load on the PCell. A PUCCH SCell may be employed for UCI transmission of SCells in the corresponding PUCCH group.

In an example embodiment, a flexible PUCCH configuration in which control signalling is sent on one, two or more PUCCHs may be possible. Beside the PCell, it may be possible to configure a selected number of SCells for PUCCH transmission (herein called PUCCH SCells). Control signalling information conveyed in a certain PUCCH SCell may be related to a set of SCells in a corresponding PUCCH group that are configured by the network via RRC signalling.

PUCCH control signalling carried by a PUCCH channel may be distributed between a PCell and SCells for offloading or robustness purposes. By enabling a PUCCH in an SCell, it may be possible to distribute the overall CSI reports for a given UE between a PCell and a selected number of SCells (e.g. PUCCH SCells), thereby limiting PUCCH CSI resource consumption by a given UE on a certain cell. It may be possible to map CSI reports for a certain SCell to a selected PUCCH SCell. An SCell may be assigned a certain periodicity and time-offset for transmission of control information. Periodic CSI for a serving cell may be mapped on a PUCCH (on the PCell or on a PUCCH-SCell) via RRC signalling. The possibility of distributing CSI reports, HARQ feedbacks, and/or Scheduling Requests across PUCCH SCells may provide flexibility and capacity improvements. HARQ feedback for a serving cell may be mapped on a PUCCH (on the PCell or on a PUCCH SCell) via RRC signalling.

In example embodiments, PUCCH transmission may be configured on a PCell, as well as one SCell in CA. An SCell PUCCH may be realized using the concept of PUCCH groups, where aggregated cells are grouped into two or more PUCCH groups. One cell from a PUCCH group may be configured to carry a PUCCH. More than 5 carriers may be configured. In the example embodiments, up to n carriers may be aggregated. For example, n may be 16, 32, or 64. Some CCs may have non-backward compatible configurations supporting only advanced UEs (e.g. support licensed assisted access SCells). In an example embodiment, one SCell PUCCH (e.g. two PUCCH groups) may be supported. In another example embodiment, a PUCCH group concept with multiple (more than one) SCells carrying PUCCH may be employed (e.g., there can be more than two PUCCH groups).

In an example embodiment, a given PUCCH group may not comprise serving cells of both MCG and SCG. One of the PUCCHs may be configured on the PCell. In an example embodiment, PUCCH mapping of serving cells may be configured by RRC messages. In an example embodiment, a maximum value of an SCellIndex and a ServCellIndex may be 31 (ranging from 0 to 31). In an example, a maximum value of stag-Id may be 3. The CIF for a scheduled cell may be configured explicitly. A PUCCH SCell may be configured by giving a PUCCH configuration for an SCell. A HARQ feedback and CSI report of a PUCCH SCell may be sent on the PUCCH of that PUCCH SCell. The HARQ feedback and CSI report of a SCell may sent on a PUCCH of a PCell if no PUCCH SCell is signalled for that SCell. The HARQ feedback and CSI report of an SCell may be sent on the PUCCH of one PUCCH SCell; hence they may not be sent on the PUCCH of different PUCCH SCell. The UE may report a Type 2 PH for serving cells configured with a PUCCH. In an example embodiment, a MAC activation/deactivation may be supported for a PUCCH SCell. An eNB may manage the activation/deactivation status for SCells. A newly added PUCCH SCell may be initially deactivated.

Figure 11:
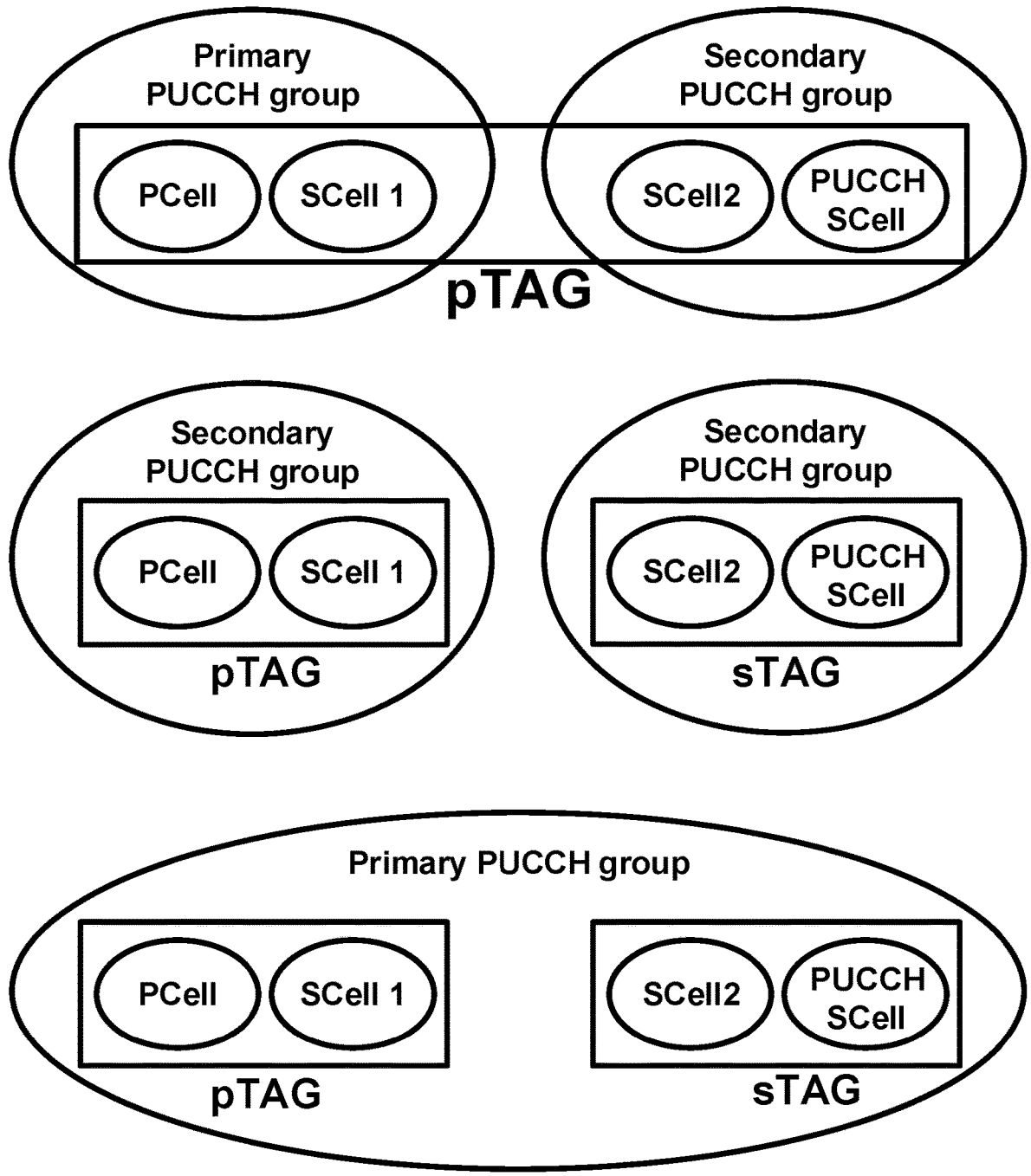
FIG. 11 illustrates example groupings of cells into one or more PUCCH groups and one or more TAGs as per an aspect of an embodiment of the present invention.
Figure 12:
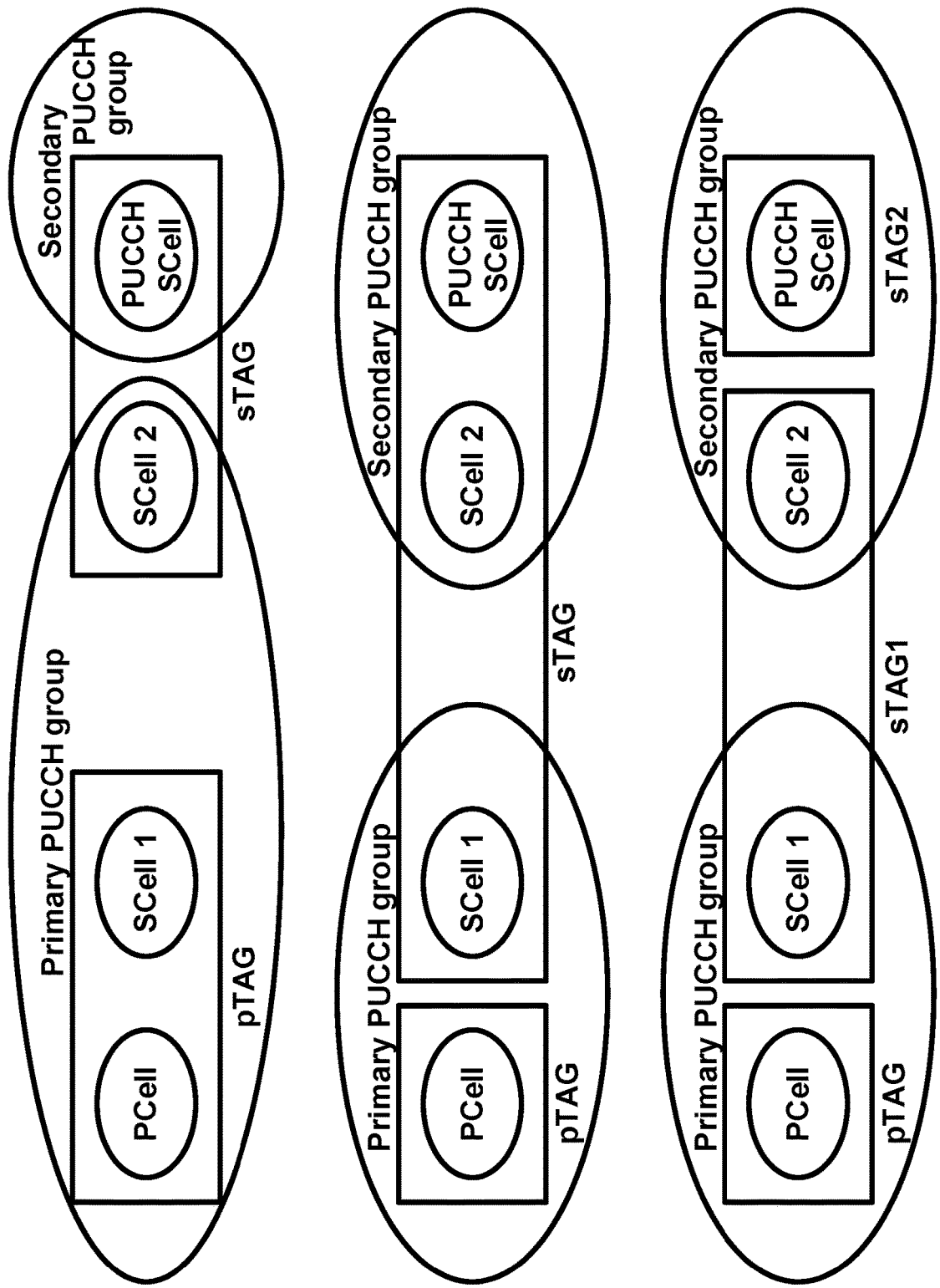
FIG. 12 illustrates example groupings of cells into one or more PUCCH groups and one or more TAGs as per an aspect of an embodiment of the present invention.

In an example embodiment, independent configuration of PUCCH groups and TAGs may be supported. FIG. 11 and FIG. 12 show example configurations of TAGs and PUCCH groups. For example, one TAG may contain multiple serving cells with a PUCCH. For example, each TAG may only comprise cells of one PUCCH group. For example, a TAG may comprise the serving cells (without a PUCCH) which belong to different PUCCH groups.

There may not be a one-to-one mapping between TAGs and PUCCH groups. For example, in a configuration, a PUCCH SCell may belong to primary TAG. In an example implementation, the serving cells of one PUCCH group may be in different TAGs and serving cells of one TAG may be in different PUCCH groups. Configuration of PUCCH groups and TAGs may be left to eNB implementation. In another example implementation, restriction(s) on the configuration of a PUCCH cell may be specified. For example, in an example embodiment, cells in a given PUCCH group may belong to the same TAG. In an example, an sTAG may only comprise cells of one PUCCH group. In an example, one-to-one mapping between TAGs and PUCCH groups may be implemented. In implementation, cell configurations may be limited to some of the examples. In other implementations, some or all the below configurations may be allowed.

In an example embodiment, for an SCell in a pTAG, the timing reference may be a PCell. For an SCell in an sTAG, the timing reference may be any activated SCell in the sTAG. For an SCell (configured with PUCCH or not) in a pTAG, a pathloss reference may be configured to be a PCell or an SIB-2 linked SCell. For an SCell in a sTAG, the pathloss reference may be the SIB-2 linked SCell. When a TAT associated with a pTAG is expired, the TAT associated with sTAGs may be considered as expired. When a TAT of an sTAG containing PUCCH SCell expires, the MAC may indicate to an RRC to release PUCCH resource for the PUCCH group. When the TAT of an sTAG containing a PUCCH SCell is not running, the uplink transmission (PUSCH) for SCells in the secondary PUCCH group not belonging to the sTAG including the PUCCH SCell may not be impacted. The TAT expiry of an sTAG containing a PUCCH SCell may not trigger TAT expiry of other TAGs to which other SCells in the same PUCCH group belong. When the TAT associated with sTAG not containing a PUCCH SCell is not running, the wireless device may stop the uplink transmission for the SCell in the sTAG and may not impact other TAGs.

In an example embodiment, a MAC entity may have a configurable timer timeAlignmentTimer per TAG. The timeAlignmentTimer may be used to control how long the MAC entity considers the Serving Cells belonging to the associated TAG to be uplink time aligned. The MAC entity may, when a Timing Advance Command MAC control element is received, apply the Timing Advance Command for the indicated TAG; start or restart the timeAlignmentTimer associated with the indicated TAG. The MAC entity may, when a Timing Advance Command is received in a Random Access Response message for a serving cell belonging to a TAG and/or if the Random Access Preamble was not selected by the MAC entity, apply the Timing Advance Command for this TAG and start or restart the timeAlignmentTimer associated with this TAG. Otherwise, if the timeAlignmentTimer associated with this TAG is not running, the Timing Advance Command for this TAG may be applied and the timeAlignmentTimer associated with this TAG started. When the contention resolution is considered not successful, a timeAlignmentTimer associated with this TAG may be stopped. Otherwise, the MAC entity may ignore the received Timing Advance Command.

Example embodiments of the invention may enable operation of multiple PUCCH groups. Other example embodiments may comprise a non-transitory tangible computer readable media comprising instructions executable by one or more processors to cause operation of PUCCH groups. Yet other example embodiments may comprise an article of manufacture that comprises a non-transitory tangible computer readable machine-accessible medium having instructions encoded thereon for enabling programmable hardware to cause a device (e.g. wireless communicator, UE, base station, etc.) to enable operation of PUCCH groups. The device may include processors, memory, interfaces, and/or the like. Other example embodiments may comprise communication networks comprising devices such as base stations, wireless devices (or user equipment: UE), servers, switches, antennas, and/or the like. In an example embodiment one or more TAGs may be configured along with PUCCH group configuration.

Figure 13:
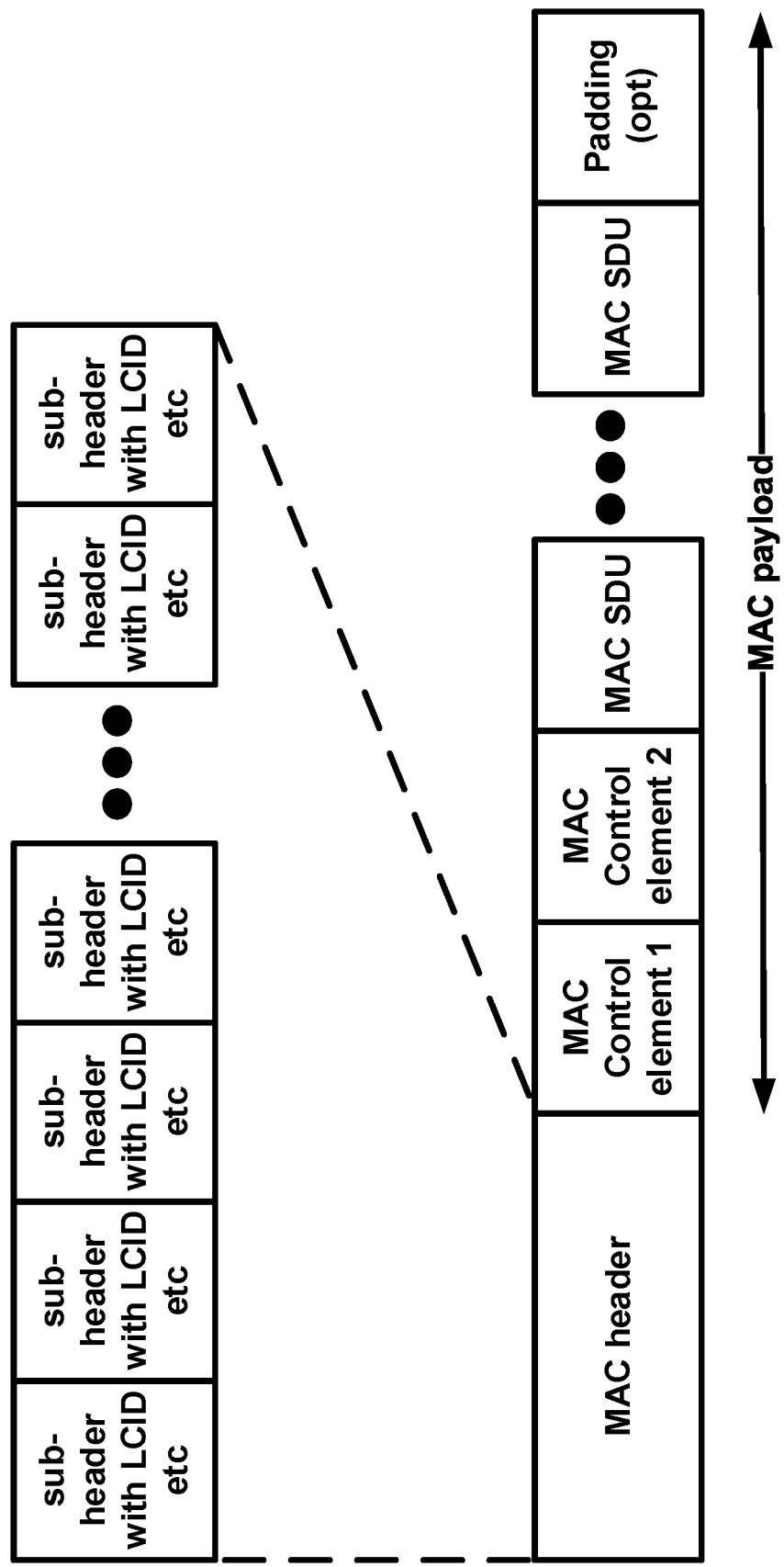
FIG. 13 is an example MAC PDU as per an aspect of an embodiment of the present invention.

FIG. 13 is an example MAC PDU as per an aspect of an embodiment of the present invention. In an example embodiment, a MAC PDU may comprise of a MAC header, zero or more MAC Service Data Units (MAC SDU), zero or more MAC control elements, and optionally padding. The MAC header and the MAC SDUs may be of variable sizes. A MAC PDU header may comprise one or more MAC PDU subheaders. A subheader may correspond to either a MAC SDU, a MAC control element or padding. A MAC PDU subheader may comprise header fields R, F2, E, LCID, F, and/or L. The last subheader in the MAC PDU and subheaders for fixed sized MAC control elements may comprise the four header fields R, F2, E, and/or LCID. A MAC PDU subheader corresponding to padding may comprise the four header fields R, F2, E, and/or LCID.

In an example embodiment, LCID or Logical Channel ID field may identify the logical channel instance of the corresponding MAC SDU or the type of the corresponding MAC control element or padding. There may be one LCID field for a MAC SDU, MAC control element or padding included in the MAC PDU. In addition to that, one or two additional LCID fields may be included in the MAC PDU when single-byte or two-byte padding is required but cannot be achieved by padding at the end of the MAC PDU. The LCID field size may be, e.g. 5 bits. L or the Length field may indicate the length of the corresponding MAC SDU or variable-sized MAC control element in bytes. There may be one L field per MAC PDU subheader except for the last subheader and subheaders corresponding to fixed-sized MAC control elements. The size of the L field may be indicated by the F field and F2 field. The F or the Format field may indicate the size of the Length field. There may be one F field per MAC PDU subheader except for the last subheader and subheaders corresponding to fixed-sized MAC control elements and expect for when F2 is set to 1. The size of the F field may be 1 bit. In an example, if the F field is included, and/or if the size of the MAC SDU or variable-sized MAC control element is less than 128 bytes, the value of the F field is set to 0, otherwise it is set to 1. The F2 or the Format2 field may indicate the size of the Length field. There may be one F2 field per MAC PDU subheader. The size of the F2 field may be 1 bit. In an example, if the size of the MAC SDU or variable-sized MAC control element is larger than 32767 bytes and if the corresponding subheader is not the last subheader, the value of the F2 field may be set to 1, otherwise it is set to 0. The E or the Extension field may be a flag indicating if more fields are present in the MAC header or not. The E field may be set to "1" to indicate another set of at least R/F2/E/LCID fields. The E field may be set to "0" to indicate that either a MAC SDU, a MAC control element or padding starts at the next byte. R or reserved bit, set to "0".

MAC PDU subheaders may have the same order as the corresponding MAC SDUs, MAC control elements and padding. MAC control elements may be placed before any MAC SDU. Padding may occur at the end of the MAC PDU, except when single-byte or two-byte padding is required. Padding may have any value and the MAC entity may ignore it. When padding is performed at the end of the MAC PDU, zero or more padding bytes may be allowed. When single-byte or two-byte padding is required, one or two MAC PDU subheaders corresponding to padding may be placed at the beginning of the MAC PDU before any other MAC PDU subheader. In an example, a maximum of one MAC PDU may be transmitted per TB per MAC entity, a maximum of one MCH MAC PDU can be transmitted per TTI.

At least one RRC message may provide configuration parameters for at least one cell and configuration parameters for PUCCH groups. The information elements in one or more RRC messages may provide mapping between configured cells and PUCCH SCells. Cells may be grouped into a plurality of cell groups and a cell may be assigned to one of the configured PUCCH groups. There may be a one-to-one relationship between PUCCH groups and cells with configured PUCCH resources. At least one RRC message may provide mapping between an SCell and a PUCCH group, and PUCCH configuration on PUCCH SCell.

System information (common parameters) for an SCell may be carried in a RadioResourceConfigCommonSCell in a dedicated RRC message. Some of the PUCCH related information may be included in common information of an SCell (e.g. in the RadioResourceConfigCommonSCell). Dedicated configuration parameters of SCell and PUCCH resources may be configured by dedicated RRC signaling using, for example, RadioResourceConfigDedicatedSCell.

The IE PUCCH-ConfigCommon and IE PUCCH-ConfigDedicated may be used to specify the common and the UE specific PUCCH configuration respectively.

In an example, PUCCH-ConfigCommon may include: deltaPUCCH-Shift: ENUMERATED {ds1, ds2, ds3}; nRB-CQI: INTEGER (0 . . . 98); nCS-AN: INTEGER (0 . . . 7); and/or n1PUCCH-AN: INTEGER (0 . . . 2047). The parameter deltaPUCCH-Shift ($\Delta_{shift}^{PUCcH}$), $n_{RB-CQI}$ ($N_{RB}^{(2)}$), nCS-An ($N_{cs}^{(1)}$), and n1PUCCH-AN ($N_{PUCCH}^{(1)}$) may be physical layer parameters of PUCCH.

PUCCH-ConfigDedicated may be employed. PUCCH-ConfigDedicated may include: ackNackRepetition CHOICE{release: NULL, setup: SEQUENCE {repetitionFactor: ENUMERATED {n2, n4, n6, spare1}, n1PUCCH-AN-Rep: INTEGER (0 . . . 2047)}}, tdd-AckNackFeedbackMode: ENUMERATED {bundling, multiplexing} OPTIONAL}. ackNackRepetitionj parameter indicates whether ACK/NACK repetition is configured. n2 corresponds to repetition factor 2, n4 to 4 for repetitionFactor parameter ($N_{ANRep}$). n1PUCCH-AN-Rep parameter may be $n_{PUCCH,ANRep}^{(1,p)}$ for antenna port P0 and for antenna port P1. dd-AckNackFeedbackMode parameter may indicate one of the TDD ACK/NACK feedback modes used. The value bundling may correspond to use of ACK/NACK bundling whereas, the value multiplexing may correspond to ACK/NACK multiplexing. The same value may apply to both ACK/NACK feedback modes on PUCCH as well as on PUSCH.

The parameter PUCCH-ConfigDedicated may include simultaneous PUCCH-PUSCH parameter indicating whether simultaneous PUCCH and PUSCH transmissions is configured. An E-UTRAN may configure this field for the PCell when the nonContiguousUL-RA-WithinCC-Info is set to supported in the band on which PCell is configured. The E-UTRAN may configure this field for the PSCell when the nonContiguousUL-RA-WithinCC-Info is set to supported in the band on which PSCell is configured. The E-UTRAN may configure this field for the PUCCH SCell when the nonContiguousUL-RA-WithinCC-Info is set to supported in the band on which PUCCH SCell is configured.

A UE may transmit radio capabilities to an eNB to indicate whether UE support the configuration of PUCCH groups. The simultaneous PUCCH-PUSCH in the UE capability message may be applied to both a PCell and an SCell. Simultaneous PUCCH+PUSCH may be configured separately (using separate IEs) for a PCell and a PUCCH SCell. For example, a PCell and a PUCCH SCell may have different or the same configurations related to simultaneous PUCCH+PUSCH.

The eNB may select the PUCCH SCell among current SCells or candidate SCells considering cell loading, carrier quality (e.g. using measurement reports), carrier configuration, and/or other parameters. From a functionality perspective, a PUCCH Cell group management procedure may include a PUCCH Cell group addition, a PUCCH cell group release, a PUCCH cell group change and/or a PUCCH cell group reconfiguration. The PUCCH cell group addition procedure may be used to add a secondary PUCCH cell group (e.g., to add PUCCH SCell and one or more SCells in the secondary PUCCH cell group). In an example embodiment, cells may be released and added employing one or more RRC messages. In another example embodiment, cells may be released employing a first RRC message and then added employing a second RRC messages.

SCells including PUCCH SCell may be in a deactivated state when they are configured. A PUCCH SCell may be activated after an RRC configuration procedure by an activation MAC CE. An eNB may transmit a MAC CE activation command to a UE. The UE may activate an SCell in response to receiving the MAC CE activation command.

In example embodiments, a timer is running once it is started, until it is stopped or until it expires; otherwise it may not be running A timer can be started if it is not running or restarted if it is running. For example, a timer may be started or restarted from its initial value.

Example power headroom trigger condition configuration parameters in an RRC message are shown below. Other examples may be implemented. phr-Config CHOICE {release NULL, setup SEQUENCE {periodicPHR-Timer ENUMERATED {sf10, sf20, sf50, sf100, sf200, sf500, sf1000, infinity}, prohibitPHR-Timer ENUMERATED {sf0, sf10, sf20, sf50, sf100, sf200, sf500, sf1000}, dl-PathlossChange ENUMERATED {dB1, dB3, dB6, infinity}}

The parameter periodicPHR-Timer may be a timer for PHR reporting. Value in number of sub-frames. Value sf10 corresponds to 10 subframes, sf20 corresponds to 20 subframes and so on.

The parameter prohibitPHR-Timer may be a timer for PHR reporting. Value in number of sub-frames. Value sf0 corresponds to 0 subframes, sf100 corresponds to 100 subframes and so on.

The parameter dl-PathlossChange may be DL Pathloss Change and the change of the required power backoff due to power management (as allowed by P-MPRc) for PHR reporting. Value in dB. Value dB1 corresponds to 1 dB, dB3 corresponds to 3 dB and so on. The same value may apply for each serving cell (although the associated functionality is performed independently for each cell).

A Power Headroom reporting procedure may be employed to provide a serving eNB with information about the difference between nominal UE maximum transmit power and estimated power for UL-SCH transmission per activated serving cell. The Power Headroom reporting procedure may also to provide a serving eNB with information about the difference between the nominal UE maximum power and the estimated power for an UL-SCH and PUCCH transmission on a SpCell and/or a PUCCH SCell.

The reporting period, delay and mapping of Power Headroom may be defined. An RRC may control Power Headroom reporting by configuring at least two timers periodicPHR-Timer and prohibitPHR-Timer, and by signalling dl-PathlossChange which may set the change in measured downlink pathloss and the power backoff due to power management (as allowed by P-MPR$_c$) to trigger a PHR.

In an example embodiment, a Power Headroom Report (PHR) may be triggered if one or more of the following events occur (not listed in any particuar order). First, a prohibitPHR-Timer expires or has expired and the path loss has changed more than dl-PathlossChange dB for at least one activated serving cell of any MAC entity which is used as a pathloss reference since the last transmission of a PHR in this MAC entity when the MAC entity has UL resources for new transmission. Second, a periodicPHR-Timer expires. Third, upon configuration or reconfiguration of the power headroom reporting functionality by upper layers, which is not used to disable the function. Fourth, activation of an SCell of any MAC entity with a configured uplink; Fifth, addition of an PSCell; and/or sisxth, a prohibitPHR-Timer expires or has expired, when the MAC entity has UL resources for a new transmission, and the following is true in this TTI for any of the activated serving cells of any MAC entity with a configured uplink (there may be UL resources allocated for transmission or there may be a PUCCH transmission on this cell, and the required power backoff due to power management (as allowed by P-MPRc) for this cell has changed more than dl-PathlossChange dB since the last transmission of a PHR when the MAC entity had UL resources allocated for transmission or PUCCH transmission on this cell).

In an example implementation, the MAC entity may avoid triggering a PHR when the required power backoff due to power management decreases temporarily (e.g. for up to a few tens of milliseconds) and it may avoid reflecting such temporary decrease in the values of PCMAX,c/PH when a PHR is triggered by other triggering conditions.

If the MAC entity has UL resources allocated for a new transmission for this TTI, the MAC entity may start a periodicPHR-Timer if it is the first UL resource allocated for a new transmission since the last MAC reset. A UE may transmit a corresponding PHR report if a Power Headroom reporting procedure determines that at least one PHR has been triggered and not cancelled, and if the allocated UL resources can accommodate a corresponding PHR MAC control element plus its subheader for a corresponding PHR configuration as a result of logical channel prioritization.

For example, a UE may transmit a corresponding PHR report for one or more activated serving cells with a configured uplink if: the allocated UL resources can accommodate a PHR MAC control element plus its subheader if neither extendedPHR nor dualConnectivityPHR is configured, and/or an Extended PHR MAC control element plus its subheader if an extendedPHR is configured, and/or a Dual Connectivity PHR MAC control element plus its subheader if dualConnectivityPHR is configured as a result of logical channel prioritization.

In LTE Release-10 carrier aggregation (CA), an Extended Power Headroom Report (PHR) MAC Control Element (CE) was introduced to accomodate type 2 power headroom (PH) of PCell and type 1 PHs of SCells. Type 2 PH may be employed when simultaneousPUCCH-PUSCH configuration is supported. In DC, since a PUCCH may be transmitted on a PCell and an PSCell, the PHR MAC CE may contain 2 type 2 PHs and several type 1 PHs. DC PHR MAC CE was introduced to include an extra type 2 PH of a PSCell. For DC, PH may be reported to both eNBs separately, but the PHR may include PH for active serving cells.

In LTE Release-12, three types of power headroom related MAC CEs are defined: 1) a Power Headroom Report MAC CE, 2) An Extended Power Headroom Report MAC CE, and 3) Dual Connectivity Power Headroom. A MAC CE may be identified by a logical channel ID (LCID) field in a MAC subheader. The LCID field may identify the logical channel instance of the corresponding MAC SDU and/or the type of the corresponding MAC control element and/or padding.

Values of LCID for UL-SCH MAC CE in Release-12 are defined in 3GPP TS 36.321 V12.4.0 as: Index 11000: Dual Connectivity Power Headroom Report; Index 11001: Extended Power Headroom Report; and Index 11010: Power Headroom Report If an extendedPHR mode is configured and when conditions for transmission of a PHR are met, a UE may generate and transmit an Extended PHR MAC control element identified by, for exampe, LCID=11001.

If a dualConnectivityPHR mode is configured and when conditions for transmission of a PHR are met, a UE may generate and transmit a Dual Connectivity Power Headroom Report identified by, for exampe, LCID=11000.

If a PHR is configured but neither extendedPHR mode nor dualConnectivityPHR mode is configured, and when conditions for transmission of a PHR are met, then a UE may generate and transmit a Power Headroom Report with, for example, an LCID of 11010.

LTE Release-12 does not appear to address configuration, message format, trigger conditions, and message processing for power headroom when a PUCCH SCell with simultaneous PUCCH+PUSCH transmissions is configured in a UE (without configuring DC in the UE). A Release-12 Dual Connectivity Power Headroom Report may not be applicable in such a scenario, since dual connectivity may not be configured in the UE. A Release-12 Extended Power Headroom Report may not be applicable since it does not appear to support transmission of two Type 2 power headrooms when PUCCH groups are configured. A Release-12 Power Headroom Report report may not be applicable since it appears to support only one serving cell. There may be a need for enhancing the power headroom implementation to efficiently support PUCCH group configuration. There may also be a need for enhancing the power headroom implementation to enhanced cell configurations not supported by existing PHR formats.

A new PHR may be called an extendedPHR2 MAC CE and/or an extended cell configuration PHR MAC CE and/or a new extended PHR MAC CE. The new PHR may also be called by other names (e.g. PUCCH group PHR MAC CE, enhanced configuration MAC CE, 32 cell PHR MAC CE, etc., and/or the like). An ExtendedPHR2 MAC CE may also support additional features in addition to PUCCH groups. For example, an ExtendedPHR2 MAC CE may support more than 5 cells including a primary cell and more than k secondary cells (e.g. k=4, 7, etc, may support up to 32 cells) and/or many other features.

The number of used MAC LCIDs may increase if a new PHR MAC CE command format with a new MAC LCID is implemented for an extendedPHR2. A MAC LCID may be included in a MAC subheader. In an example embodiment, an existing MAC LCID may be employed for an extendedPHR2 (e.g. LCID of Dual connectivity or LCID of Extended PHR). A UE may transmit PHR MAC CEs to an eNB in unicast messages. Both the UE and the eNB may have information about the current RRC configurations of the UE. The UE may use the same LCID for or one or more PHR transmissions and the UE may identify the format of the PHR based on RRC configuration parameters.

This enhancement may not require introducing a new LCID for an extendedPHR2. Two different power headroom MAC CEs may use the same LCID. This mechanism may reduce the number of LCIDs used in the MAC layer (compared with the scenario wherein a new LCID is introduced) and may further simplify a UE implementation. RRC configuration parameters in addition to an LCID may be employed to determine the format of the PHR MAC CE.

A UE may consider UE RRC cell configurations to decide the format of a PHR MAC CE. For example, if a UE is configured with a first RRC configuration for a plualrity of cells (e.g. 5 cells) of an eNB with no configured PUCCH SCell, then the fields in the MAC CE may be updated using processes related to an extendedPHR power headroom. If a UE is configured with PUCCH groups, then the fields in the MAC CE may be updated using processes related to an extendedPHR2 PHR. On the other hand, an eNB receiving the PHR MAC CE may have information about the RRC configuration of the UE transmitting the PHR MAC CE, and may interpret the PHR MAC CE fields based on the corresponding RRC configuration.

In LTE-Advanced Rel-12, a Type 2 power headroom may be reported when simultaneous PUCCH-PUSCH is configured for a given cell, for example, a PCell and/or a PSCell. A PCell and/or a PSCell may be active after being configured. When simultaneous PUCCH-PUSCH is configured for a PCell and a PSCell, Type 1 and Type 2 PH fields for the PCell and the PSCell may be included in a PHR report. In an example embodiment, a PUCCH SCell may be deactivated in some scenarios. If and when a PUCCH SCell is deactivated, there may not be a need to include Type 1 and Type 2 PH reports for the PUCCH SCell in the extendedPHR2 report. This may require implementation of new processes and format for a PHR, in which a Type 2 and/or Type 1 PHR may or may not be reported for the PUCCH SCell.

In the current DC PHR MAC CE, when a Type 2 PH is reported for a PCell, the octet containing the Type 2 PH field may be included first after the octet indicating the presence of a PH per cell (PSCell and SCells of MAC entities) and followed by an octet containing an associated PCMAX,c field (if reported). When a Type 2 PH is reported for the PSCell, the octet containing the Type 2 PH field may be included followed by an octet containing the associated PCMAX,c field (if reported).

In an extendedPHR2 PHR MAC CE, a Type 2 PH field for PUCCH SCell may not be reported when a PUCCH SCell is deactivated (even if a simultaneousPUCCH-PUSCH is configured for the PUCCH SCell). In an example embodiment, the UE may indicate the presence of the Type 2 PH field of the PUCCH SCell using ServCellIndex bits present in a Ci bitmap of the PHR MAC CE. This mechanism may allow selectively transmitting a Type 2 PH for a PUCCH SCell when needed. A Type 1 PH and octet with an associated PCMAX,c field (if reported) may be included (e.g. in ascending order based on the ServCellIndex). A Type 1 may be reported for the PCell and for other serving cells of MAC entities as indicated in the bitmap.

In the example embodiment, when a DC PHR is configured, the UE and eNB may not employ a ServCellIndex bit Ci (or another indicator) to determine the presence of a second type 2 PH after a Type 2 PH for a PCell. However, when a PUCCH group PHR is configured, the UE and eNB may employ a ServCellIndex bit Ci (or another indicator) to determine the presence of a Type 2 PH. The example embodiment may enhance the existing implementation process for Type 2 PH field(s) in a PHR MAC CE. Unlike DC PHR MAC CE, a second Type 2 PH may or may not be present depending on the value of the ServCellIndex bit Ci (or another indicator) in a PHR. For example, a value 0 for a PUCCH SCell index ServCellIndex (or another indicator) may indicate a second Type 2 PHR and a PCMAX,c are not reported. A value 1 for the PUCCH SCell index ServCellIndex may indicate a second Type 2 PHR is reported. The corresponding PCMAX,c may also be reported after the second Type 2 PH (if needed according to PH procedure).

In an example embodiment, a UE may receive at least one RRC message comprising configuration parameters for a plurality of cells comprising a primary cell and one or more secondary cells. The plurality of cells may be grouped into a plurality of physical uplink control channel (PUCCH) groups comprising: a primary PUCCH group comprising the primary cell; and a secondary PUCCH group comprising a PUCCH secondary cell in the one or more secondary cells. In an example, the RRC message may comprise one or more parameters indicating whether simultaneous PUCCH and physical uplink shared channel transmission is configured in the primary cell and the PUCCH secondary cell. The UE may transmit a power headroom report (PHR) media-access-control control element (MAC CE). A PHR MAC CE may comprise: a first parameter indicating a Type 2 power headroom of the primary cell; a second parameter (e.g., ServCellIndex bit Ci corresponding to the PUCCH SCell) indicating whether a Type 2 power headroom of the PUCCH secondary cell is present in the PHR MAC CE; and a third parameter indicating the Type 2 power headroom of the PUCCH secondary cell only if the second parameter indicates the presence of the Type 2 power headroom of the PUCCH secondary cell. When the Type 2 power headroom of the PUCCH secondary cell is not present then the corresponding PCMAX,c may not be present. In an example, when the PUCCH SCell is activated, the second paramter indicates the presence of a Type 2 PHR field for the primary cell and Type 2 PHR field for the PUCCH SCell. When the PUCCH SCell is activated, a Type 2 PHR field for the primary cell and Type 2 PHR field for the PUCCH SCell are included and reported in the PHR report.

In an example implementation, the following process may be implemented in the UE. If an extendedPHR2 is configured, then for each activated serving cell with configured uplink: a) obtain the value of a Type 1 power headroom; and b) if the MAC entity has UL resources allocated for transmission on the serving cell for the TTI, then obtain the value for the corresponding PCMAX,c field from the physical layer.

If an extendedPHR2 is configured and if a PUCCH SCell is configured and activated: a) obtain the value of the Type 2 power headroom for the PCell and PUCCH SCell; and b) obtain the values for the corresponding PCMAX,c fields from the physical layer. Otherwise, If an extendedPHR2 is configured and if a PUCCH SCell is not configured or PUCCH SCell is deactivated: if simultaneousPUCCH-PUSCH is configured for the PCell: a) obtain the value of the Type 2 power headroom for the PCell; and b) obtain the value for the corresponding PCMAX,c field from the physical layer.

The UE may instruct the multiplexing and assembly procedure to generate and transmit an Extended PHR MAC control element for an extendedPHR2 according to a configured ServCellIndex and the PUCCH(s) for the MAC entity based on the values reported by the physical layer.

In an example embodiment, when an extendedPHR2 is configured the following process may be implemented for transmission of Type 2 and PCMAX,c fields in the PHR. If a PUCCH SCell is configured and activated, the wireless device may obtain the value of the Type 2 power headroom for the PCell and the PUCCH SCell for transmission; and the wireless device may obtain the values for the corresponding PCMAX,c fields from the physical layer for transmission. In this case, a Type 2 PH of a PUCCH SCell and a PCell may be transmitted regardless of whether a simultaneous PUCCH-PUSCH is configured for the PCell and/or the PUCCH SCell. Parallel transmission of a PUCCH and a PUSCH may be possible in different PUCCH groups. When a PUCCH SCell is not configured or a PUCCH SCell is de-activated: if simultaneousPUCCH-PUSCH is configured for the PCell, the wireless device may obtain the value of the Type 2 power headroom for the PCell for transmission; and the wireless device may obtain the value for the corresponding PCMAX,c field from the physical layer for transmission. In this case, when a simultaneous PUCCH-PUSCH is not configured for the PCell, a Type 2 PH may not be transmitted for the PCell. When a PUCCH SCell is not configured or a PUCCH SCell is de-activated no Type1 PHR and Type 2 PHR is reported for the PUCCH SCell.

In an example embodiment, a new information element may be introduced in a MAC-MainConfig to indicate an extendedPHR2 PHR (or called extended cell configuration PHR, new extended PHR) MAC CE format is employed by the UE to report power headroom. The new IE may be called an extendedPHR2 and/or other name. The extendedPHR2 IE may indicate if a power headroom is reported using the extendedPHR2 PHR MAC CE (e.g. using value release/ setup). An E-UTRAN may configure the value setup if a PUCCH SCell is configured (PUCCH groups are configured). An E-UTRAN may configure an extendedPHR2 if a phr-Config is configured. The UE may release the extendedPHR2 if the phr-Config is released.

The extendedPHR2 IE may indicate if power headroom is reported using the extendedPHR2 PHR MAC CE (e.g. using value release/setup). In an example embodiment, an E-UTRAN may configure an extendedPHR2 when a first configuration with an enhanced PHR format(s) is configured. For example, an E-UTRAN may configure a value setup if a primary cell and more than k secondary cells with configured uplink(s) are configured (for example k=4, 7, . . . ). For example, an E-UTRAN may configure the value setup if any of the serving cells with an uplink configured has a servingCellIndex higher than n (e.g. n=4, 7). An E-UTRAN may configure the value setup if a PUCCH SCell is configured (PUCCH groups are configured). An E-UTRAN may configure an extendedPHR2 if a phr-Config is configured. The UE may release an extendedPHR2 if pa hr-Config is released.

An extendedPHR2 IE may indicate if power headroom is reported using an extendedPHR2 PHR MAC CE (e.g. using value release/setup). In an example embodiment, an E-UTRAN may configure a value setup if any serving cells with an uplink configured have a servingCellIndex higher than n (e.g. n=4, 7) and/or if a PUCCH SCell (with any number of serving cells with an uplink configured) is configured. An E-UTRAN may configure an extendedPHR2 if a phr-Config is configured. The UE may release an extendedPHR2 if a phr-Config is released.

In an embodiment of the invention, a new RRC configuration parameter (extendedPHR2) may be employed to configure and enable an extendedPHR2 PHR in a UE. For example, when an extendedPHR2 is set up in the UE, the UE may be set up with multiple cells and PUCCH groups. In an example embodiment, the UE may consider the cell RRC configuration and the extendedPHR2 to determine the format of the extendedPHR2 MAC CE to be transmitted. If the extendedPHR2 is set up, the UE may transmit a PHR using the extendedPHR2 PHR MAC CE format and an LCID when required.

In an example embodiment, when a PUCCH SCell is configured and deactivated, an extendedPHR2 PHR report format may be used, and a Ci value for the PUCCH SCell may be set to a value (e.g. 0) indicating that the PUCCH SCell is deactivated. A predefined format and/or values in a MACE CE may be employed to indicate that a PUCCH SCell is deactivated. A UE may not transmit Type 1 and Type 2 PH reports for a deactivated PUCCH SCell.

Using a new IE in MAC-MainConfig in an RRC message may provide flexibility in the implementation of extendedPHR2 and provide capability to configure additional parameters for extendedPHR2 PHR and provide additional PHR reporting capabilities in the UE.

In an example embodiment, Extended Power Headroom Report MAC Control Elements may comprise one or more fields. For an extendedPHR, the Extended Power Headroom Report (PHR) MAC control element may be identified by a MAC PDU subheader with an LCID and/or RRC configuration. The Extended PHR MAC CE may have a variable size. When a Type 2 PH is reported, the octet containing the Type 2 PH field may be included first after the octet indicating the presence of a PH per SCell and followed by an octet containing an associated PCMAX,c field (if reported). Then it may follow in ascending order based on the ServCellIndex an octet with the Type 1 PH field and an octet with the associated PCMAX,c field (if reported), for the PCell and for each SCell indicated in the bitmap.

In an example embodiment, for an extendedPHR2, the Extended Power Headroom Report (PHR) MAC control elements may be identified by a MAC PDU subheader with an LCID and/or an RRC configuration. They may have variable sizes. One or more octets with C fields may be used for indicating the presence of PH per SCell. When a Type 2 PH is reported for the PCell, the octet containing the Type 2 PH field may be included first after the octet(s) indicating the presence of a PH per SCell and followed by an octet containing an associated PCMAX,c field (if reported). The it may follow the Type 2 PH field for the PUCCH SCell (if the PUCCH on the SCell is configured and Type 2 PH may be reported for the PUCCH SCell), followed by an octet containing an associated PCMAX,c field (if reported). It may follow in ascending order based on the ServCellIndex an octet with the Type 1 PH field and an octet with the associated PCMAX,c field (if reported), for the PCell and for each SCell indicated in the bitmap.

Extended PHR MAC Control Elements may be defined as follows. A Ci field may indicate the presence of a PH field for an SCell with a SCellIndex i. The Ci field set to "1" may indicate that a PH field for the SCell with an SCellIndex i is reported. The Ci field set to "0" may indicate that a PH field for the SCell with an SCellIndex i is not reported. An "R" field may be a reserved bit set to "0". A "V" field may indicate if the PH value is based on a real transmission or a reference format. For a Type 1 PH, V=0 may indicate a real transmission on a PUSCH and V=1 may indicate that a PUSCH reference format is used. For a Type 2 PH, V=0 may indicater a real transmission on a PUCCH and V=1 may indicate that a PUCCH reference format is used. For both a Type 1 and a Type 2 PH, V=0 may indicate the presence of the octet containing an associated PCMAX,c field, and V=1 may indicate that the octet containing the associated PCMAX,c field may be omitted. A Power Headroom (PH) field may indicate the power headroom level. The length of the field may be, for example, 6 bits. A "P" field may indicate whether the MAC entity applies a power backoff due to power management (as allowed by P-MPRc). The MAC entity may set P=1 if the corresponding PCMAX,c field would have had a different value if no power backoff due to power management had been applied. A "PCMAX,c" field, if present, may indicate the $\tilde{P}_{CMAX,c}$ or used for calculation of the preceding PH field.

There may be two types of UE power headroom reports, Type 1 and Type 2. A UE power headroom PH may be valid for subframe i for serving cell c.

If the UE is configured with an SCG, and if a higher layer parameter phr-ModeOtherCG-r12 for a CG indicates 'virtual' for power headroom reports transmitted on that CG, the UE may compute PH assuming that it does not transmit a PUSCH/PUCCH on any serving cell of the other CG.

If the UE is configured with an SCG for computing power headroom for cells belonging to MCG, the term 'serving cell' may refer to a serving cell belonging to the MCG. For computing power headroom for cells belonging to an SCG, the term 'serving cell' may refer to a serving cell belonging to the SCG. The term 'primary cell' may refer to the PSCell of the SCG. If the UE is configured with a PUCCH SCell for computing power headroom for cells belonging to a primary PUCCH group, the term 'serving cell' may refer to a serving cell belonging to the primary PUCCH group. For computing power headroom for cells belonging to a secondary PUCCH group, the term 'serving cell' may refer to serving cell belonging to the secondary PUCCH group. The term 'primary cell' may refer to the PUCCH-SCell of the secondary PUCCH group.

An example Type 1 and Type 2 power headroom calculations is presented here. Example parameters and example calculation method is presented in standard document 3GPP TS 36.213 standard documents of the corresponding LTE release.

Type 1:

If the UE transmits PUSCH without PUCCH in subframe i for serving cell c, power headroom for a Type 1 report may be computed using $$PH_{type1,c}(i) = P_{CMAX,c}(i) - \{10 \log_{10}(M_{PUSCH,c}(i)) + P_{O\_PUSCH,c}(j) + \alpha_c(j) \cdot PL_c + \Delta_{TF,c}(i) + f_c(i)\} \text{ [dB]}$$

where, example $P_{CMAX,c}(i)$, $M_{PUSCH,c}(i)$, $P_{O\_PUSCH,c}(j)$, $\alpha_c(j)$, $PL_c$, $\Delta_{TF,c}(i)$ and $f_c(i)$ may be defined as follows. $P_{CMAX,c}(i)$, may be the configured UE transmit power in subframe i for serving cell c and $\hat{P}_{CMAX,c}(i)$ may be the linear value of $P_{CMAX,c}(i)$. $M_{PUSCH,c}(i)$ may be the bandwidth of the PUSCH resource assignment expressed in number of resource blocks valid for subframe i and serving cell c. Po_PUSCH, c(j) may be configured employing RRC configuration parameters. If the UE is configured with higher layer parameter UplinkPowerControlDedicated-v12x0 for serving cell c and if subframe i belongs to uplink power control subframe set 2 as indicated by the higher layer parameter tpc-SubframeSet-r12. For j=0 or 1, $\alpha_c(j) = \alpha_{c,2}$ ∈{0, 0.4, 0.5, 0.6, 0.7, 0.8, 0.9, 1}. $\alpha_{c,2}$ is the parameter alpha-SubframeSet2-r12 provided by higher layers for each serving cell c. For j=2, $\alpha_c(j)=1$. Otherwise: For j=0 or 1, $\alpha_c$ ∈{0, 0.4, 0.5, 0.6, 0.7, 0.8, 0.9, 1} may be a 3-bit parameter provided by higher layers for serving cell c. For j=2, $\alpha_c(j)=1$.; $PL_c$ may be the downlink path loss estimate calculated in the UE for serving cell c in dB and $PL_c$=referenceSignalPower–higher layer filtered RSRP, where referenceSignalPower is provided by higher layers and RSRP for the reference serving cell and the higher layer filter configuration for the reference serving cell.; $\Delta_{TF,c}(i) = 10 \log_{10}((2^{BPRE \cdot K_s}-1) \cdot \beta_{offset}^{PUSCH})$ for $K_S=1.25$ and 0 for $K_S=0$ where $K_S$ is given by the parameter deltaMCS-Enabled provided by higher layers for each serving cell c. BPRE and $\beta_{offset}^{PUSCH}$, for each serving cell c, are computed as below. $K_S=0$ for transmission mode 2.; f(i) may be a function of power control commands.

$PL_c$ is, for example, the downlink path loss estimate calculated in the UE for serving cell c in dB and $PL_c$=referenceSignalPower–higher layer filtered RSRP, where referenceSignalPower is provided by higher layers. The UE may measure on or more pathloss values employing signals received on one or more pathloss reference cells. A pathloss reference cell may be configured for a serving cell. The UE may calculate $PL_c$ and may employ one or more pathloss values ($PL_c$) for calculation of Type 1 and Type 2 power headroom fields. If serving cell C belongs to a TAG containing the primary cell then, for the uplink of the primary cell, the primary cell may be used as the reference serving cell for determining referenceSignalPower and higher layer filtered RSRP. For the uplink of the secondary cell, the serving cell configured by the higher layer parameter pathlossReferenceLinking may be used as the reference serving cell for determining referenceSignalPower and higher layer filtered RSRP. If serving cell C belongs to a TAG containing the PSCell then, for the uplink of the PSCell, the PSCell may be used as the reference serving cell for determining referenceSignalPower and higher layer filtered RSRP. For the uplink of the secondary cell other than PSCell, the serving cell configured by the higher layer parameter pathlossReferenceLinking may be used as the reference serving cell for determining referenceSignalPower and higher layer filtered RSRP.

If the UE transmits PUSCH with PUCCH in subframe i for serving cell C power headroom for a Type 1 report may be computed using:

$$PH_{type1,c}(i) = \tilde{P}_{CMAX,c}(i) - \{10 \log_{10}(M_{PUSCH,c}(i)) + P_{O\_PUSCH,c}(j) + \alpha_c(j) \cdot PL_c + \Delta_{TF,c}(i) + f_c(i)\} \text{[dB]}$$

$\tilde{P}_{CMAX,c}(i)$ may be computed assuming a PUSCH only transmission in subframe i. For this case, the physical layer may deliver $\tilde{P}_{CMAX,c}(i)$ instead of $P_{CMAX,c}(i)$ to higher layers. If the UE does not transmit PUSCH in subframe i for serving cell c, power headroom for a Type 1 report may be computed using $$PH_{type1,c}(i) = \tilde{P}_{CMAX,c}(i) - \{P_{O\_PUSCH,c}(1) + \alpha_c(1) \cdot PL_c + f_c(i)\}\text{[dB]}$$

where, example $\tilde{P}_{CMAX,c}(i)$ may be computed assuming MPR=0 dB, A-MPR=0 dB, P-MPR=0 dB and □TC=0 dB.

Type 2:

If the UE transmits PUSCH simultaneous with PUCCH in subframe i for the primary cell, power headroom for a Type 2 report is computed using:

$$PH_{type2}(i) = P_{CMAX,c}(i) -$$

$$10\log_{10}\left(\begin{array}{l}10^{(10\log_{10}(M_{PUSCH,c}(i))+P_{O\_PUSCH,c}(j)+\alpha_c(j)PL_c+\Delta_{TF,c}(i)+f_c(i))/10} + \\ 10^{(P_{0\_PUCCH}+PL_c+h(n_{CQI},n_{HARQ},n_{SR})+\Delta_{F\_PUCCH}(F)+\Delta_{T\times D}(F')+g(i))/10}\end{array}\right)[dB]$$

If the UE transmits PUSCH without PUCCH in subframe i for the primary cell, power headroom for a Type 2 report is computed using:

$$PH_{type2}(i) = P_{CMAX,c}(i) -$$

$$10\log_{10}\left(\begin{array}{l}10^{(10\log_{10}(M_{PUSCH,c}(i))+P_{O\_PUSCH,c}(j)+\alpha_c(j)\cdot PL_c+\Delta_{TF,c}(i)+f_c(i))/10} + \\ 10^{(P_{0\_PUCCH}+PL_c+g(i))/10}\end{array}\right)[dB]$$

where, example $P_{CMAX,c}(i)$, $M_{PUSCH,c}(i)$, $P_{O\_PUSCH,c}(j)$, $\alpha_c(j)$, $\Delta_{TF,c}(i)$ and $f_c(i)$ may be of the primary cell parameters. If the UE transmits PUCCH without PUSCH in subframe i for the primary cell, power headroom for a Type 2 report is computed using:

$$PH_{type2}(i) = P_{CMAX,c}(i) -$$

$$10\log_{10}\left(\begin{array}{l}10^{(P_{O\_PUSCH,c}(1)+\alpha_c(1)\cdot PL_c+f_c(i))/10} + \\ 10^{(P_{0\_PUCCH}+PL_c+h(n_{CQI},n_{HARQ},n_{SR})+\Delta_{F\_PUCCH}(F)+\Delta_{T\times D}(F')+g(i))/10}\end{array}\right)[dB]$$

where, example $P_{O\_PUSCH,c}(1)$, $\alpha_c(1)$ and $f_c(i)$ are the primary cell parameters. If the UE does not transmit PUCCH or PUSCH in subframe i for the primary cell, power headroom for a Type 2 report is computed using:

$$PH_{type2}(i) = \tilde{P}_{CMAX,c}(i) - 10\log_{10}\left(\begin{array}{l}10^{(P_{O\_PUSCH,c}(1)+\alpha_c(1)\cdot PL_c+f_c(i))/10} + \\ 10^{(P_{0\_PUCCH}+PL_c+g(i))/10}\end{array}\right)[dB]$$

where, example $\tilde{P}_{CMAX,c}(i)$ may be computed assuming MPR=0 dB, A-MPR=0 dB, P-MPR=0 dB and Tc=0 dB, $P_{O\_PUSCH,c}(1)$, $\alpha_c(1)$ and $f_c(i)$ are the primary cell parameters. If the UE is unable to determine whether there is a PUCCH transmission corresponding to PDSCH transmission(s) or not, or which PUCCH resource is used, in subframe i for the primary cell, before generating power headroom for a Type 2 report, upon (E)PDCCH detection, with the following conditions: (1) if both PUCCH format 1b with channel selection and simultaneousPUCCH-PUSCH are configured for the UE, or (2) if PUCCH format 1b with channel selection is used for HARQ-ACK feedback for the UE configured with PUCCH format 3 and simultaneousPUCCH-PUSCH are configured, then, UE may be allowed to compute power headroom for a Type 2 using:

$$PH_{type2}(i) = P_{CMAX,c}(i) -$$

$$10\log_{10}\left(\begin{array}{l}10^{(10\log_{10}(M_{PUSCH,c}(i))+P_{O\_PUSCH,c}(j)+\alpha_c(j)\cdot PL_c+\Delta_{TF,c}(i)+f_c(i))/10} + \\ 10^{(P_{0\_PUCCH}+PL_c+g(i))/10}\end{array}\right)[dB]$$

where, example $P_{CMAX,c}(i)$, $M_{PUSCH,c}(i)$ $P_{O\_PUSCH,c}(j)$, $\alpha_c(j)$, $\Delta_{TF,c}(i)$ and $f_c(i)$ are the primary cell parameters.

The power headroom may be rounded to the closest value in the range [40; −23] dB with steps of 1 dB and is delivered by the physical layer to higher layers. If the UE is configured with higher layer parameter UplinkPowerControlDedicated-v12x0 for serving cell c and if subframe 1 belongs to uplink power control subframe set 2 as indicated by the higher layer parameter tpc-SubframeSet-r12, the UE may use $f_{c,2}(i)$ instead of $f_c(i)$ to compute $PH_{type1,c}(i)$ and $PH_{type2,c}(i)$ for subframe i and serving cell c.

Figure 14:
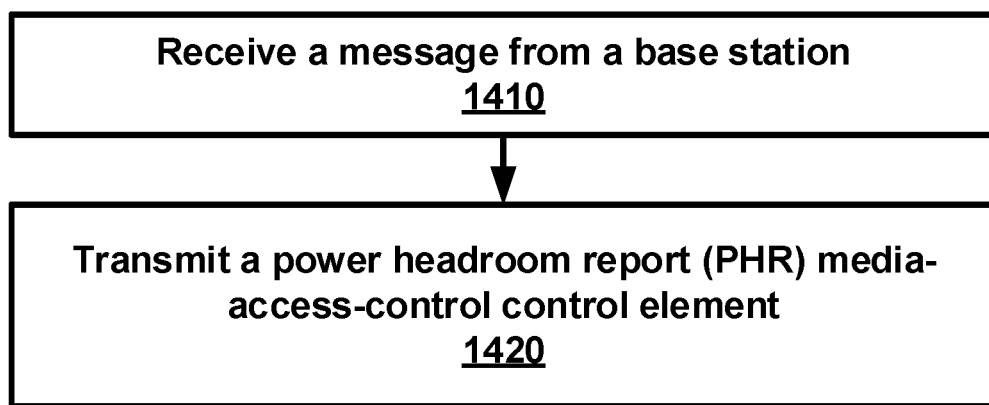
FIG. 14 is an example flow diagram as per an aspect of an embodiment of the present invention.

FIG. 14 is an example flow diagram as per an aspect of an embodiment of the present invention. A wireless device receives at least one message from a base station at 1410. The message may comprise configuration parameters of a plurality of cells. The plurality of cells may comprise a primary cell and a PUCCH secondary cell. The primary cell may comprise a primary physical uplink control channel (PUCCH) transmitted to the base station. The PUCCH secondary cell may comprise a secondary PUCCH transmitted to the base station.

A power headroom report (PHR) media-access-control control element (MAC CE) may be transmitted by the UE (wireless device) at 1420. The PHR MAC CE may comprise a first field and a second field. The first field may indicate whether a Type 2 power headroom field for the PUCCH secondary cell is present in the PHR MAC CE. The second field may indicate a Type 2 power headroom level for the PUCCH secondary cell only if the first field indicates the presence of the Type 2 power headroom field for the PUCCH secondary cell.

The at least one message may further comprise a first information element indicating whether simultaneous PUCCH transmission and a physical uplink shared channel transmission may be configured for the primary cell. The at least one message may further comprise a second information element indicating whether simultaneous PUCCH transmission and physical uplink shared channel transmission is configured for the PUCCH secondary cell.

The PHR MAC CE may further comprise a third field indicating a Type 2 power headroom level for the primary cell. The PHR MAC CE may comprise a Type 1 power headroom field for the PUCCH secondary cell different from the Type 2 power headroom field for the PUCCH secondary cell. The PHR MAC CE may be employed by the base station for at least one of uplink packet scheduling or uplink power control.

In an example implementation, a calculation of the Type 2 power headroom level may employ a calculated power of a physical uplink control channel and a calculated power of a physical uplink shared channel A calculation of a Type 1 power headroom level may employ the calculated power of a physical uplink shared channel A measurement value may be obtained by measuring a signal of a pathloss reference. The calculation of the Type 2 power headroom level may employ the measurement value. The wireless device may report the Type 2 power headroom level for the PUCCH secondary cell and a Type 2 power headroom for the primary cell when the PUCCH secondary cell is activated.

Figure 15:
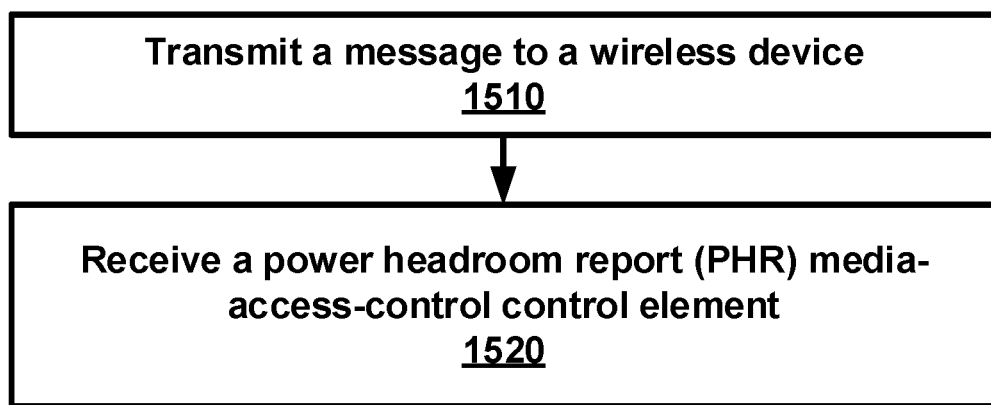
FIG. 15 is an example flow diagram as per an aspect of an embodiment of the present invention.

FIG. 15 is an example flow diagram as per an aspect of an embodiment of the present invention. A base station transmits at least one message to a wireless device at 1510. The message may comprise configuration parameters of a plurality of cells. The plurality of cells may comprise a primary cell and a PUCCH secondary cell. The primary cell may comprise a primary physical uplink control channel (PUCCH) transmitted to the base station. The PUCCH secondary cell may comprise a secondary PUCCH transmitted to the base station.

A power headroom report (PHR) media-access-control control element (MAC CE) may be received at 1520. The PHR MAC CE may comprise a first field, a second field, and a third field. The first field may indicate that a Type 2 power headroom field for the PUCCH secondary cell is present in the PHR MAC CE. The second field may indicate a Type 2 power headroom level for the PUCCH secondary cell. The third field may indicate a Type 2 power headroom level for the primary cell.

The at least one message may comprise a first information element indicating whether simultaneous PUCCH transmission and physical uplink shared channel transmission is configured for the primary cell. The message(s) may also comprise a second information element indicating whether simultaneous PUCCH transmission and physical uplink shared channel transmission is configured for the PUCCH secondary cell.

The PHR MAC CE may comprise a fourth field indicating a Type 1 power headroom level for the primary cell. The PHR MAC CE may comprise a Type 1 power headroom field for the PUCCH secondary cell that is different from the Type 2 power headroom field for the PUCCH secondary cell. The PHR MAC CE may be employed by the base station for uplink packet scheduling and/or uplink power control.

The base station may receive a Type 2 power headroom level for the PUCCH secondary cell and a Type 2 power headroom level for the primary cell when the PUCCH secondary cell is activated in the wireless device.

A primary PUCCH group may comprise a group of serving cells including a PCell whose PUCCH signaling is associated with the PUCCH on PCell. A PUCCH group may comprise either a primary PUCCH group or a secondary PUCCH group. A Secondary PUCCH group may comprise a group of SCells whose PUCCH signalling is associated with the PUCCH on the PUCCH SCell.

With regard to a Physical uplink control channel (PUCCH), a PUCCH may be transmitted on a PCell, a PUCCH SCell (if such is configured in CA) and on a PSCell (in DC).

With regard to carrier aggregation, the configured set of serving cells for a UE may comprise of one PCell and one or more SCells. If DC is not configured one additional PUCCH may be configured on an SCell and/or the PUCCH SCell. When a PUCCH SCell is configured, an RRC may configure the mapping of each serving cell to a Primary PUCCH group and/or a Secondary PUCCH group, (e.g., for each SCell, whether the PCell and/or the PUCCH SCell is used for the transmission of ACK/NAKs and CSI reports).

With regard to Power Headroom Reporting. If an extendedPHR2 is configured: for each activated Serving Cell with configured uplink: a) the value of the Type 1 power headroom may be obtained. b) If the MAC entity has UL resources allocated for transmission on the Serving Cell for this TTI: the value for the corresponding PCMAX,c field may be obtained from the physical layer. If a PUCCH SCell is configured and activated: a) the value of the Type 2 power headroom for the PCell and PUCCH SCell may be obtained, and/or b) the values for the corresponding PCMAX,c fields from the physical layer may be obtained. Otherwise (when a PUCCH SCell is not configured or PUCCH SCell is deactivated), if simultaneous PUCCH-PUSCH is configured for the PCell: a) the value of the Type 2 power headroom for the PCell may be obtained; b) the value for the corresponding PCMAX,c field from the physical layer may be obtained. Multiplexing and Assembly procedure may be instructed to generate and transmit an Extended PHR MAC control element for an extendedPHR2 according to configured ServCellIndex and the PUCCH(s) for the MAC entity based on values reported by the physical layer.

With regard to Extended Power Headroom Report MAC Control Elements the following may be considered. For extendedPHR2, the Extended Power Headroom Report (PHR) MAC control elements may be identified by a MAC PDU subheader with an LCID. C fields may be employed for indicating the presence of PH per SCell. When a Type 2 PH is reported for a PCell, the octet containing the Type 2 PH field may be included first after the octet(s) indicating the presence of PH per SCell and followed by an octet containing the associated PCMAX,c field (if reported). The Type 2 PH field for the PUCCH SCell may follow (if a PUCCH on an SCell is configured and a Type 2 PH is reported for the PUCCH SCell), followed by an octet containing the associated PCMAX,c field (if reported). Then an octet with the Type 1 PH field and an octet with the associated PCMAX,c field (if reported) for the PCell and for each SCell indicated in the bitmap may follow in ascending order based on the ServCellIndex.

The Extended PHR MAC Control Elements may comprise a multitude of fields, at least some of which are discussed here. A Ci may may indicate the presence of a PH field for the SCell with SCellIndex i. The Ci field may be set to "1" to indicate that a PH field for the SCell with SCellIndex i is reported. The Ci field may be set to "0" to indicate that a PH field for the SCell with SCellIndex i is not reported. An R field may be a reserved bit, set to, for example, "0". A V field may indicate if the PH value is based on a real transmission or a reference format. For a Type 1 PH, V=0 may indicate a real transmission on PUSCH and V=1 may indicate that a PUSCH reference format is employed. For Type 2 PH, V=0 may indicate real transmission on PUCCH and V=1 may indicate that a PUCCH reference format is employed. Furthermore, for both Type 1 and Type 2 PH, V=0 may indicate the presence of the octet containing the associated PCMAX,c field, and V=1 may indicate that the octet containing the associated PCMAX,c field is omitted;

A Power Headroom (PH) field may indicate the power headroom level. The length of the field may be, for example, 6 bits. A P field may indicate whether a MAC entity applies a power backoff due to power management (as allowed, for example, by a P-MPRc). The MAC entity may set P=1 if the corresponding PCMAX,c field would have had a different value if no power backoff due to power management had been applied. A PCMAX,c field, if present may indicate the PCMAX,c or $\tilde{P}_{CMAX,c}$ used for calculation of a preceding PH field.

FIG. 14 is an example flow diagram as per an aspect of an embodiment of the present invention. A wireless device receives at least one message from a base station at 1410. The message may comprise configuration parameters of a plurality of cells and a first information element (IE) and a second IE. The plurality of cells may be employed to communicate with a base station. The IE may indicate that a new extended power headroom report is configured. The first IE is configured as setup when a secondary cell in the plurality of cells is configured with a PUCCH and the second IE indicates that a power headroom report is configured as setup.

When the value of an IE is setup, it implies that the feature represented by the IE is configured in the wireless device (UE). When the second IE is configured as set up, it indicates that power headroom reporting is configured in the UE. When the first IE is configured as setup, it indicates that Extended PHR2 reporting is configured in the UE.

A media-access-control (MAC) packet comprising a first Type 2 power headroom field of a primary cell and a second Type 2 power headroom field of the secondary cell may be transmitted at 1420 when the secondary cell is activated. The MAC packet may comprise a subheader comprising a logical channel identifier (LCID).

The message(s) may comprise a prohibit power headroom report timer IE, and/or a periodic power headroom report timer IE. In an example implementation, a cell index of a cell in the plurality of cells may be higher than a predefined value (e.g. 5 or 7). A cell index of a cell with a configured uplink may be higher than a predefined value (e.g. 5 or 7).

A calculation of the second Type 2 power headroom level may employ a calculated power of the PUCCH and a calculated power of a physical uplink shared channel A calculation of a Type 1 power headroom level of the secondary cell may employ a calculated power of the physical uplink shared channel. The power headroom report may be configurable as at least one of the following: the power headroom report, a dual connectivity power headroom report, an extended power headroom report, the new extended power headroom report, a combination thereof, and/or the like.

Various embodiments may be practiced according to FIG. 14. For example, a wireless device may receive at least one message from a base station at 1410. The message may comprise configuration parameters of a plurality of cells and a first information element (IE) and a second IE. Each cell in the plurality of cells may have a configured uplink for communication with a base station. The first IE may indicate that a new extended power headroom report is configured. The first IE may be configured as setup when: a cell index of a first cell in the plurality of cells is higher than a predefined value; and a second IE indicates that a power headroom report is configured as setup. At 1420, a media-access-control (MAC) packet comprising a power headroom value of the first cell may be transmitted to the eNB.

In an example embodiment, a wireless device may receive at least one message comprising configuration parameters of a plurality of cells. Each cell in the plurality of cells may have a configured uplink for communication with a base station. The at least one message may comprise a first IE and a second IE. The first IE may indicate a new extended power headroom report (power headroom report) is configured. The first IE is configured as setup when: a cell index of a first cell in the plurality of cells is higher than a predefined value (e.g. 5 or 7); and a second IE indicates that a power headroom report is configured as setup. The wireless device may transmit a media-access-control (MAC) packet comprising a power headroom value of the first cell.

In an example embodiment, a wireless device may receive at least one message comprising configuration parameters of a plurality of cells. Each cell in the plurality of cells may have a configured uplink for communication with a base station. The at least one message may comprise a first IE and a second IE. The first IE may indicate a new extended power headroom report (power headroom report) is configured. The first IE is configured as setup when: a number of the plurality of cells is higher than a predefined value (e.g. 5, 7 or 8); and a second IE indicates that a power headroom report is configured as setup. The wireless device may transmit a media-access-control (MAC) packet comprising a power headroom value of the first cell.

In this specification, "a" and "an" and similar phrases are to be interpreted as "at least one" and "one or more." In this specification, the term "may" is to be interpreted as "may, for example." In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

In this specification, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using FDD communication systems. However, one skilled in the art will recognize that embodiments of the invention may also be implemented in a system comprising one or more TDD cells (e.g. frame structure 2 and/or frame structure 3-licensed assisted access). The disclosed methods and systems may be implemented in wireless or wireline systems. The features of various embodiments presented in this invention may be combined. One or many features (method or system) of one embodiment may be implemented in other embodiments. Only a limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112.

The invention claimed is:

1. A method for use in a wireless device, the method comprising:
   receiving, by the wireless device from a base station, at least one radio resource configuration (RRC) message comprising:
      a power headroom parameter indicating whether an extended power headroom report format is setup, wherein the extended power headroom report format is configured as setup based on a secondary cell of a plurality of cells being configured with a physical uplink control channel (PUCCH); and
   transmitting, based on both the extended power headroom report format being setup and the secondary cell being activated, a media-access-control (MAC) control element, formatted according to the extended power headroom report format, comprising:
      a first Type 2 power headroom field corresponding to a primary cell of the plurality of cells; and
      a second Type 2 power headroom field corresponding to the secondary cell of the plurality of cells configured with the PUCCH.

2. The method of claim 1, further comprising:
   receiving, via the secondary cell and based on the second Type 2 power headroom field, at least one message.

3. The method of claim 1, wherein the second Type 2 power headroom field corresponding to the secondary cell is based on a calculated power of the PUCCH of the secondary cell and a calculated power of a physical uplink shared channel (PUSCH) of the secondary cell.

4. The method of claim 1, further comprising transmitting a subheader comprising a logical channel identifier (LCID) associated with the MAC control element.

5. The method of claim 1, wherein the power headroom parameter indicates that the extended power headroom report format is setup based on at least one of:
   at least one PUCCH secondary cell being configured, wherein the secondary cell is a PUCCH secondary cell; or
   a serving cell, of the plurality of cells, having an uplink configured with a serving cell index higher than a first threshold,
   wherein a network configures the extended power headroom report format as setup.

6. The method of claim 1, further comprising:
   determining, based on the power headroom parameter, to use the extended power headroom report format for a MAC packet comprising the MAC control element.

7. The method of claim 1, wherein the at least one RRC message comprises a prohibit power headroom report timer information element (IE) and a periodic power headroom report timer IE.

8. The method of claim 1, wherein the extended power headroom report format is different from a second extended power headroom report format, and wherein the second extended power headroom report format is used based on secondary cells being not configured with a PUCCH.

9. A wireless device comprising:
   one or more processors; and
   memory storing instructions that, when executed by the one or more processors, cause the wireless device to:
      receive, from a base station, at least one radio resource configuration (RRC) message comprising:
         a power headroom parameter indicating whether an extended power headroom report format is setup, wherein the extended power headroom report format is configured as setup based on a secondary cell of a plurality of cells being configured with a physical uplink control channel (PUCCH); and
      transmit, based on both the extended power headroom report format being setup and the secondary cell being activated, a media-access-control (MAC) control element, formatted according to the extended power headroom report format, comprising:
         a first Type 2 power headroom field corresponding to a primary cell of the plurality of cells; and
         a second Type 2 power headroom field corresponding to the secondary cell of the plurality of cells configured with the PUCCH.

10. The wireless device of claim 9, wherein the instructions, when executed by the one or more processors, further cause the wireless device to
receive, via the secondary cell and based on the second Type 2 power headroom field, at least one message.

11. The wireless device of claim 9, wherein the second Type 2 power headroom field corresponding to the secondary cell is based on a calculated power of the PUCCH of the secondary cell and a calculated power of a physical uplink shared channel (PUSCH) of the secondary cell.

12. The wireless device of claim 9, wherein the instructions, when executed by the one or more processors, cause the wireless device to transmit a subheader comprising a logical channel identifier (LCID) associated with the MAC control element.

13. The wireless device of claim 9, wherein the power headroom parameter indicates that the extended power headroom report format is setup based on at least one of:
at least one PUCCH secondary cell being configured, wherein the secondary cell is a PUCCH secondary cell; or
a serving cell, of the plurality of cells, having an uplink configured with a serving cell index higher than a first threshold,
wherein a network configures the extended power headroom report format as setup.

14. The wireless device of claim 9, wherein the instructions, when executed by the one or more processors, further cause the wireless device to:
determine, based on the power headroom parameter, to use the extended power headroom report format for a MAC packet comprising the MAC control element.

15. The wireless device of claim 9, wherein the at least one RRC message comprises a prohibit power headroom report timer information element (IE) and a periodic power headroom report timer IE.

16. The wireless device of claim 9, wherein the extended power headroom report format is different from a second extended power headroom report format, and wherein the second extended power headroom report format is used based on secondary cells being not configured with a PUCCH.

17. A method for use in a base station, the method comprising:
transmitting, by the base station to a wireless device, at least one radio resource configuration (RRC) message comprising:
a power headroom parameter indicating whether an extended power headroom report format is setup,
wherein the extended power headroom report format is configured as setup based on a secondary cell of a plurality of cells being configured with a physical uplink control channel (PUCCH); and
receiving, based on both the extended power headroom report format being setup and the secondary cell being activated, a media-access-control (MAC) control element, formatted according to the extended power headroom report format, comprising:
a first Type 2 power headroom field corresponding to a primary cell of the plurality of cells; and
a second Type 2 power headroom field corresponding to the secondary cell of the plurality of cells configured with the PUCCH.

18. The method of claim 17, further comprising:
transmitting, via the secondary cell and based on the second Type 2 power headroom field, at least one message.

19. The method of claim 17, wherein the second Type 2 power headroom field corresponding to the secondary cell is based on a calculated power of the PUCCH of the secondary cell and a calculated power of a physical uplink shared channel (PUSCH) of the secondary cell.

20. The method of claim 17, further comprising receiving a subheader comprising a logical channel identifier (LCID) associated with the MAC control element.

21. The method of claim 17, wherein the power headroom parameter indicates that the extended power headroom report format is setup based on at least one of:
at least one PUCCH secondary cell being configured, wherein the secondary cell is a PUCCH secondary cell; or
a serving cell, of the plurality of cells, having an uplink configured with a serving cell index higher than a first threshold,
wherein a network configures the extended power headroom report format as setup.

22. The method of claim 17, wherein the at least one RRC message comprises a prohibit power headroom report timer information element (IE) and a periodic power headroom report timer IE.

23. The method of claim 17, wherein the extended power headroom report format is different from a second extended power headroom report format, and wherein the second extended power headroom report format is used based on secondary cells being not configured with a PUCCH.

24. A base station comprising:
one or more processors; and
memory storing instructions that, when executed by the one or more processors, cause the base station to:
transmit, to a wireless device, at least one radio resource configuration (RRC) message comprising:
a power headroom parameter indicating whether an extended power headroom report format is setup,
wherein the extended power headroom report format is configured as setup based on a secondary cell of a plurality of cells being configured with a physical uplink control channel (PUCCH); and
receive, based on both the extended power headroom report format being setup and the secondary cell being activated, a media-access-control (MAC) control element, formatted according to the extended power headroom report format, comprising:
a first Type 2 power headroom field corresponding to a primary cell of the plurality of cells; and
a second Type 2 power headroom field corresponding to the secondary cell of the plurality of cells configured with the PUCCH.

25. The base station of claim 24, wherein the instructions, when executed by the one or more processors, further cause the base station to
transmit, via the secondary cell and based on the second Type 2 power headroom field, at least one message.

26. The base station of claim 24, wherein the second Type 2 power headroom field corresponding to the secondary cell is based on a calculated power of the PUCCH of the secondary cell and a calculated power of a physical uplink shared channel (PUSCH) of the secondary cell.

27. The base station of claim 24, wherein the instructions, when executed by the one or more processors, further cause the base station to receive a subheader comprising a logical channel identifier (LCID) associated with the MAC control element.

28. The base station of claim 24, wherein the power headroom parameter indicates that the extended power headroom report format is setup based on at least one of:
 at least one PUCCH secondary cell being configured, wherein the secondary cell is a PUCCH secondary cell; or
 a serving cell, of the plurality of cells, having an uplink configured with a serving cell index higher than a first threshold,
 wherein a network configures the extended power headroom report format as setup.

29. The base station of claim 24, wherein the at least one RRC message comprises a prohibit power headroom report timer information element (IE) and a periodic power headroom report timer IE.

30. The base station of claim 24, wherein the extended power headroom report format is different from a second extended power headroom report format, and wherein the second extended power headroom report format is used based on secondary cells being not configured with a PUCCH.

31. A system comprising:
 a base station; and
 a wireless device,
 wherein the base station is configured to:
  transmit, to the wireless device, at least one radio resource configuration (RRC) message comprising:
   a power headroom parameter indicating whether an extended power headroom report format is setup,
   wherein the extended power headroom report format is configured as setup based on a secondary cell of a plurality of cells being configured with a physical uplink control channel (PUCCH); and
 wherein the wireless device is configured to:
  receive, from the base station, the at least one RRC message; and
  transmit, based on both the extended power headroom report format being setup and the secondary cell being activated, a media-access-control (MAC) control element, formatted according to the extended power headroom report format, comprising:
   a first Type 2 power headroom field corresponding to a primary cell of the plurality of cells; and
   a second Type 2 power headroom field corresponding to the secondary cell of the plurality of cells configured with the PUCCH.

32. The system of claim 31, wherein the base station is further configured to:
 transmit, via the secondary cell and based on the second Type 2 power headroom field, at least one message.

33. The system of claim 31, wherein the second Type 2 power headroom field corresponding to the secondary cell is based on a calculated power of the PUCCH of the secondary cell and a calculated power of a physical uplink shared channel (PUSCH) of the secondary cell.

34. The system of claim 31, wherein the wireless device is further configured to transmit a subheader comprising a logical channel identifier (LCID) associated with the MAC control element.

35. The system of claim 31, wherein the power headroom parameter indicates that the extended power headroom report format is setup based on at least one of:
 at least one PUCCH secondary cell being configured, wherein the secondary cell is a PUCCH secondary cell; or
 a serving cell, of the plurality of cells, having an uplink configured with a serving cell index higher than a first threshold,
 wherein a network configures the extended power headroom report format as setup.

36. The system of claim 31, wherein the wireless device is further configured to:
 determine, based on the power headroom parameter, to use the extended power headroom report format for a MAC packet comprising the MAC control element.

37. The system of claim 31, wherein the at least one RRC message comprises a prohibit power headroom report timer information element (IE) and a periodic power headroom report timer IE.

38. The system of claim 31, wherein the extended power headroom report format is different from a second extended power headroom report format, and wherein the second extended power headroom report format is used based on secondary cells being not configured with a PUCCH.

39. A non-transitory computer-readable medium storing instructions that, when executed, cause:
 receiving, by a wireless device from a base station, at least one radio resource configuration (RRC) message comprising:
  a power headroom parameter indicating whether an extended power headroom report format is setup,
  wherein the extended power headroom report format is configured as setup based on a secondary cell of a plurality of cells being configured with a physical uplink control channel (PUCCH); and
 transmitting, based on both the extended power headroom report format being setup and the secondary cell being activated, a media-access-control (MAC) control element, formatted according to the extended power headroom report format, comprising:
  a first Type 2 power headroom field corresponding to a primary cell of the plurality of cells; and
  a second Type 2 power headroom field corresponding to the secondary cell of the plurality of cells configured with the PUCCH.

40. The non-transitory computer-readable medium of claim 39, wherein the instructions, when executed, further cause:
 receiving, via the secondary cell and based on the second Type 2 power headroom field, at least one message.

41. The non-transitory computer-readable medium of claim 39, wherein the second Type 2 power headroom field corresponding to the secondary cell is based on a calculated power of the PUCCH of the secondary cell and a calculated power of a physical uplink shared channel (PUSCH) of the secondary cell.

42. The non-transitory computer-readable medium of claim 39, wherein the power headroom parameter indicates that the extended power headroom report format is setup based on at least one of:
 at least one PUCCH secondary cell being configured, wherein the secondary cell is a PUCCH secondary cell; or
 a serving cell, of the plurality of cells, having an uplink configured with a serving cell index higher than a first threshold,
 wherein a network configures the extended power headroom report format as setup.

43. A non-transitory computer-readable medium storing instructions that, when executed, cause:
- transmitting, by a base station to a wireless device, at least one radio resource configuration (RRC) message comprising:
  - a power headroom parameter indicating whether an extended power headroom report format is setup,
  - wherein the extended power headroom report format is configured as setup based on a secondary cell of a plurality of cells being configured with a physical uplink control channel (PUCCH); and
- receiving, based on both the extended power headroom report format being setup and the secondary cell being activated, a media-access-control (MAC) control element, formatted according to the extended power headroom report format, comprising:
  - a first Type 2 power headroom field corresponding to a primary cell of the plurality of cells; and
  - a second Type 2 power headroom field corresponding to the secondary cell of the plurality of cells configured with the PUCCH.

44. The non-transitory computer-readable medium of claim 43, wherein the instructions, when executed, further cause:
- transmitting, via the secondary cell and based on the second Type 2 power headroom field, at least one message.

45. The non-transitory computer-readable medium of claim 43, wherein the second Type 2 power headroom field corresponding to the secondary cell is based on a calculated power of the PUCCH of the secondary cell and a calculated power of a physical uplink shared channel (PUSCH) of the secondary cell.

46. The non-transitory computer-readable medium of claim 43, wherein the power headroom parameter indicates that the extended power headroom report format is setup based on at least one of:
- at least one PUCCH secondary cell being configured, wherein the secondary cell is a PUCCH secondary cell; or
- a serving cell, of the plurality of cells, having an uplink configured with a serving cell index higher than a first threshold, wherein a network configures the extended power headroom report format as setup.

* * * * *

UNITED STATES PATENT AND TRADEMARK OFFICE
CERTIFICATE OF CORRECTION

PATENT NO. : 11,671,927 B2
APPLICATION NO. : 17/112349
DATED : June 6, 2023
INVENTOR(S) : Dinan It is certified that error appears in the above-identified patent and that said Letters Patent is hereby corrected as shown below:

On the Title Page

Column 2, item (56) Other Publications, Line 2:
Delete "SCel," and insert --SCell,-- therefor Page 3, Column 1, item (56) Other Publications, Line 11:
Delete "Fukouka," and insert --Fukuoka,-- therefor Page 3, Column 1, item (56) Other Publications, Line 12:
Delete "Yesources" and insert --resources-- therefor Page 4, Column 1, item (56) Other Publications, Line 63:
Delete "ar" and insert --or-- therefor Page 4, Column 2, item (56) Other Publications, Line 5:
Delete "ncorporated," and insert --Incorporated,-- therefor Page 4, Column 2, item (56) Other Publications, Line 21:
Delete "Infomnation" and insert --Information-- therefor In the Specification Column 11, Detailed Description of Embodiments, Line 1:
Delete "of of" and insert --of-- therefor Column 15, Detailed Description of Embodiments, Line 41:

Delete "($\Delta_{shift}^{PUCcH}$), $n_{RB-CQI}(N_{RB}^{(2)})$," and insert --$(\Delta_{shift}^{PUCCH})$, nRB-CQI $(N_{RB}^{(2)})$,-- therefor Signed and Sealed this
Twenty-fourth Day of September, 2024

Katherine Kelly Vidal
*Director of the United States Patent and Trademark Office*

CERTIFICATE OF CORRECTION (continued)
U.S. Pat. No. 11,671,927 B2

Column 16, Detailed Description of Embodiments, Line 39:
After "running", insert --.-- therefor Column 17, Detailed Description of Embodiments, Line 16:
Delete "particuar" and insert --particular-- therefor Column 17, Detailed Description of Embodiments, Line 27:
Delete "sisxth," and insert --sixth,-- therefor Column 18, Detailed Description of Embodiments, Line 26:
Delete "exampe," and insert --example,-- therefor Column 18, Detailed Description of Embodiments, Line 30:
Delete "exampe," and insert --example,-- therefor Column 18, Detailed Description of Embodiments, Line 47:
Delete "Report report" and insert --Report-- therefor Column 19, Detailed Description of Embodiments, Line 20:
Delete "plualrity" and insert --plurality-- therefor Column 20, Detailed Description of Embodiments, Line 47:
Delete "paramter" and insert --parameter-- therefor Column 23, Detailed Description of Embodiments, Line 5:
Delete "indicater" and insert --indicate-- therefor Column 23, Detailed Description of Embodiments, Line 57:
Delete "$P_{CMAXC,c}(i),$" and insert --$P_{CMAXC,c}(i)$-- therefor Column 23, Detailed Description of Embodiments, Line 65:
After "subframe", insert --i-- therefor Column 24, Detailed Description of Embodiments, Line 28:
Delete "C" and insert --c-- therefor Column 24, Detailed Description of Embodiments, Line 37:
Delete "C" and insert --c-- therefor Column 24, Detailed Description of Embodiments, Line 47:
Delete "C" and insert --c,-- therefor Column 24, Detailed Description of Embodiments, Line 55:
Delete "$\tilde{P}_{CMAX,c}(i)$" --$\tilde{P}_{CMAX,c}(i)$-- therefor

CERTIFICATE OF CORRECTION (continued)
U.S. Pat. No. 11,671,927 B2

Column 25, Detailed Description of Embodiments, Line 33:
Delete "$P_{O\_PUSCH,c}(1)$" and insert --$P_{O\_PUSCH,c}(l)$-- therefor Column 25, Detailed Description of Embodiments, Line 66:
After "$M_{PUSCH,c}(i)$", insert --,-- therefor Column 25, Detailed Description of Embodiments, Line 67:
Delete "$\Delta_{TF,c}$" and insert --$\Delta_{TF,c}(i)$-- therefor Column 26, Detailed Description of Embodiments, Line 13:
Delete "1" and insert --i-- therefor Column 26, Detailed Description of Embodiments, Line 16:
Delete "$PH_{type1,c}(i)$" and insert --$PH_{type1,c}(i)$-- therefor Column 26, Detailed Description of Embodiments, Line 65:
After "channel", insert --.-- therefor Column 26, Detailed Description of Embodiments, Line 67:
After "channel", insert --.-- therefor Column 27, Detailed Description of Embodiments, Line 65:
Delete "ACK/NAKs" and insert --ACK/NACKs-- therefor Column 28, Detailed Description of Embodiments, Line 41:
Delete "may may" and insert --may-- therefor Column 29, Detailed Description of Embodiments, Line 34:
After "channel", insert --.-- therefor In the Claims Column 33, Claim 10, Line 3:
Delete "to" and insert --to:-- therefor Column 34, Claim 25, Line 55:
Delete "to" and insert --to:-- therefor